(12) United States Patent
Jacobs

(10) Patent No.: US 12,178,352 B2
(45) Date of Patent: Dec. 31, 2024

(54) APPARATUS FOR BEVERAGE BREWING

(71) Applicant: Robert D. Jacobs, Franklin, NY (US)

(72) Inventor: Robert D. Jacobs, Franklin, NY (US)

(*) Notice: Subject to any disclaimer, the term of this patent is extended or adjusted under 35 U.S.C. 154(b) by 491 days.

(21) Appl. No.: 17/512,750

(22) Filed: Oct. 28, 2021

(65) Prior Publication Data

US 2022/0047110 A1 Feb. 17, 2022

Related U.S. Application Data

(63) Continuation-in-part of application No. 16/893,754, filed on Jun. 5, 2020, now Pat. No. 11,684,199, which is a continuation-in-part of application No. 15/688,058, filed on Aug. 28, 2017, now Pat. No. 10,729,277.

(51) Int. Cl.
| | |
|---|---|
| *A47J 31/20* | (2006.01) |
| *A23F 5/26* | (2006.01) |
| *A47J 31/44* | (2006.01) |
| *A47J 31/52* | (2006.01) |
| *A47J 31/54* | (2006.01) |

(52) U.S. Cl.
CPC ............. *A47J 31/20* (2013.01); *A23F 5/265* (2013.01); *A47J 31/4407* (2013.01); *A47J 31/5253* (2018.08); *A47J 31/54* (2013.01)

(58) Field of Classification Search
CPC ........ A47J 31/20; A47J 31/54; A47J 31/4407; A47J 31/5253; A23F 5/265
See application file for complete search history.

(56) References Cited

U.S. PATENT DOCUMENTS

| | | | | |
|---|---|---|---|---|
| 1,211,614 A | * | 1/1917 | Morales ............... | A47J 31/56 |
| | | | | 99/336 |
| 1,486,649 A | * | 3/1924 | Ewert .................. | A47J 31/20 |
| | | | | 99/319 |
| 1,572,861 A | * | 2/1926 | Larrey ................. | A47J 31/20 |
| | | | | 99/302 C |

(Continued)

FOREIGN PATENT DOCUMENTS

| | | |
|---|---|---|
| CN | 111195074 A | 5/2020 |
| DE | 3530284 A1 | 3/1987 |

(Continued)

OTHER PUBLICATIONS

English Translation for DE29712486 published Oct. 23, 1997.*

*Primary Examiner* — Anthony J Weier

(74) *Attorney, Agent, or Firm* — Getz Balich LLC

(57) ABSTRACT

An apparatus and method for brewing coffee of high quality and better taste while also enabling users to utilize less coffee grounds per brewing cycle, thereby achieving significant cost savings. A basket that houses a packet of coffee grounds is housed within a carafe that stores water. The basket is fabricated so that water may enter therein and exit therefrom, and the packet of coffee grounds enables water and natural coffee oils to penetrate the packet, but does not allow coffee grounds to escape the packet. The carafe is filled with water that is gradually heated from at or around tap temperature to approximately boiling. While the water in the chamber is heated, the basket is agitated. This causes the gradually heating water to enter the basket and agitate the packet, thereby extracting natural coffee oil from the grounds stored within the packet, which creates brewed coffee.

9 Claims, 22 Drawing Sheets

(56) References Cited

U.S. PATENT DOCUMENTS

| | | | | |
|---|---|---|---|---|
| 1,602,632 | A | 10/1926 | Zorn | |
| 1,887,848 | A * | 11/1932 | Peirce | A47J 31/20 99/282 |
| 1,984,047 | A * | 12/1934 | Thieme | A47J 31/20 99/302 C |
| 2,109,363 | A * | 2/1938 | Williams | A47J 31/20 99/310 |
| 2,304,004 | A | 12/1942 | Low | |
| 2,562,433 | A * | 7/1951 | Moore | A47J 31/20 99/300 |
| 2,631,522 | A | 3/1953 | Joy | |
| 2,858,762 | A | 11/1958 | Wade | |
| 3,020,823 | A | 2/1962 | Musso | |
| 3,023,691 | A | 3/1962 | Turner | |
| 3,279,351 | A | 10/1966 | Cohn | |
| 3,527,153 | A * | 9/1970 | Orlando | A47J 31/0573 99/315 |
| 3,654,852 | A | 4/1972 | Rosan, Sr. | |
| 3,879,565 | A | 4/1975 | Einstman | |
| 4,401,014 | A | 8/1983 | McGrail | |
| 4,545,296 | A * | 10/1985 | Ben-Shmuel | A47J 31/22 99/302 C |
| 4,709,625 | A * | 12/1987 | Layre | A47J 31/18 99/289 R |
| 5,112,629 | A * | 5/1992 | Antonini | A47J 31/20 426/433 |
| 5,265,517 | A * | 11/1993 | Gilbert | A47J 31/0573 99/302 C |
| 5,676,041 | A | 10/1997 | Glucksman | |
| 5,957,035 | A | 9/1999 | Richter | |
| 6,085,638 | A | 7/2000 | Mork | |
| 6,180,159 | B1 | 1/2001 | Villagran | |
| 8,534,186 | B2 | 9/2013 | Glucksman | |
| 8,584,576 | B2 * | 11/2013 | Fogg, IV | A47J 36/2466 99/320 |
| 9,232,873 | B2 * | 1/2016 | Juris | A23F 3/18 |
| 10,104,992 | B2 * | 10/2018 | Macdonald | A47J 31/20 |
| 10,729,153 | B2 * | 8/2020 | Jacobs | A47J 31/0689 |
| 10,729,277 | B2 * | 8/2020 | Jacobs | B65D 85/8043 |
| 2001/0053399 | A1 | 12/2001 | Herod | |
| 2002/0121197 | A1 | 9/2002 | Mercier | |
| 2003/0202787 | A1 | 10/2003 | Wu | |
| 2006/0280841 | A1 | 12/2006 | Cai | |
| 2007/0169629 | A1 * | 7/2007 | Shao | A47J 31/303 99/275 |
| 2007/0278202 | A1 | 12/2007 | Long | |
| 2007/0294219 | A1 * | 12/2007 | Cherkauer | G06F 16/2454 |
| 2012/0156357 | A1 | 6/2012 | Shakhin | |
| 2013/0055901 | A1 | 3/2013 | Zhang | |
| 2013/0064956 | A1 | 3/2013 | Zeller | |
| 2013/0122156 | A1 | 5/2013 | Fisk | |
| 2013/0202748 | A1 | 8/2013 | Fountain | |
| 2014/0161936 | A1 | 6/2014 | Trombetta | |
| 2015/0056340 | A1 | 2/2015 | Trombetta | |
| 2016/0037794 | A1 | 2/2016 | Kang | |
| 2016/0264348 | A1 | 9/2016 | Camera | |
| 2016/0270581 | A1 | 9/2016 | Sealy | |
| 2016/0302437 | A1 | 10/2016 | De Kok | |
| 2017/0362020 | A1 | 12/2017 | Hanneson | |
| 2018/0118450 | A1 | 5/2018 | Trombetta | |
| 2019/0059412 | A1 | 2/2019 | Jacobs | |
| 2019/0059634 | A1 | 2/2019 | Jacobs | |
| 2019/0177079 | A1 | 6/2019 | Lach | |
| 2019/0274329 | A1 | 9/2019 | Mora | |
| 2019/0307147 | A1 | 10/2019 | Dees | |
| 2019/0328170 | A1 | 10/2019 | Cai | |
| 2020/0100520 | A1 | 4/2020 | Fishter | |
| 2020/0297153 | A1 * | 9/2020 | Jacobs | A47J 31/5253 |
| 2022/0046942 | A1 * | 2/2022 | Jacobs | A47J 31/52 |
| 2022/0133073 | A1 * | 5/2022 | Jacobs | A47J 43/044 99/287 |
| 2022/0133074 | A1 * | 5/2022 | Jacobs | A47J 31/0626 99/287 |
| 2023/0320518 | A1 * | 10/2023 | Jacobs | A47J 31/20 99/287 |
| 2024/0008678 | A1 * | 1/2024 | Jacobs | A47J 31/06 |

FOREIGN PATENT DOCUMENTS

| | | |
|---|---|---|
| DE | 4317902 A1 | 12/1994 |
| DE | 29712486 | * 10/1997 |
| EP | 0220889 B1 | 6/1991 |
| GB | 509740 A | 7/1939 |
| GB | 2495642 A | 11/2012 |
| WO | 2008049163 A1 | 5/2008 |

* cited by examiner

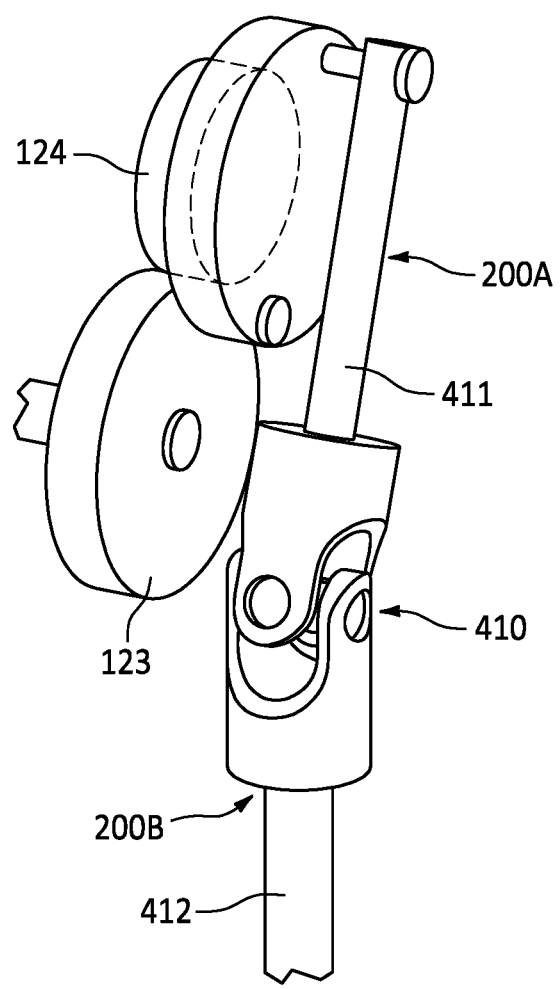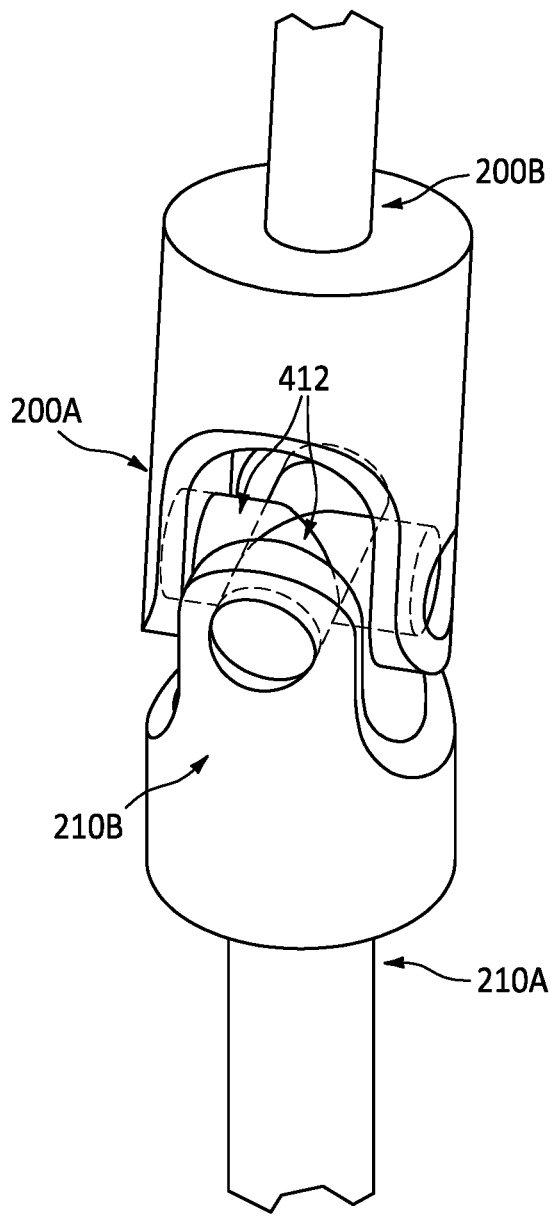
FIG. 21A
FIG. 21B

APPARATUS FOR BEVERAGE BREWING

PRIORITY CLAIM

The present application is a continuation-in-part of U.S. patent application Ser. No. 16/893,754 filed on Jun. 5, 2020, now U.S. Pat. No. 11,684,199, which is a continuation-in-part of U.S. patent application Ser. No. 15/688,058, filed on Aug. 28, 2017, now U.S. Pat. No. 10,729,277.

FIELD OF THE INVENTION

The invention relates to brewing coffee and other beverages and, more specifically, to providing an apparatus and method for brewing coffee that is more efficient than the coffee brewing systems of the prior art and that produces a higher quality coffee than can be produced by the coffee brewing systems that the industry currently offers.

BACKGROUND OF THE INVENTION

Coffee's Ubiquity & Availability

Coffee is one of the most popular drinks in America. A 2015 Gallup poll found that nearly two-thirds (64%) of Americans drink at least one cup of coffee per day. See http://www.gallup.com/poll/184388/americans-coffee-consumption-steady-few-cut-back.aspx. More telling, the same poll found that the average coffee drinker in America drinks nearly three full cups of coffee each and every day. Id.

Given coffee's wild popularity across the country, it is not surprising that coffee drinkers have more options for obtaining a cup of coffee than ever before. Today, coffee drinkers can purchase a cup of coffee at name-brand commercial coffee shops, like Starbucks and Dunkin Donuts; gas stations; street vendors; at fast food locations, such as McDonald's (as well as at almost any food serving establishment); and at numerous other locations (all locations at which a coffee drinker may purchase coffee outside of their home are collectively referred to hereafter as "coffee shops"). And research suggests that coffee drinkers indeed swarm coffee shops. Trade magazines report that the average Starbucks serves over 500 customers each day and Dunkin Donuts reports that is sells nearly 2 billion cups of coffee in America each year. http://www.businessinsider.com/how-many-customers-starbucks-will-have-201-3-10; https://news.dunkin-donuts.com/news/brand-keys-names-dunkin-donuts.

Despite the ubiquity of coffee shops, the overwhelming majority of American coffee drinkers still make their coffee at home. See, e.g., https://www.aol.com/2011/01/25/savings-experiment-the-perks-of-brewing-ve-rsus-buying-coffee/. Making coffee at home offers numerous advantages. The most notable advantage is cost: making coffee at home is drastically cheaper than buying it at coffee shops. The average cost of a cup of coffee that is purchased on-the-go ranges between $2-$5. The average cup of coffee brewed at home, however, costs on average only 16 to 22 cents depending on how much you spend per pound to buy the coffee. For example, at $8 per pound (a common price for many types of coffee in typical US grocery stores), the average 10 cup per day user spends $0.20 per cup. Not surprisingly, numerous publications that advise consumers about how to increase their savings counsel consumers to make coffee at home rather than paying the comparatively high prices charged by coffee shops.

However, there may be a drawback that at-home coffee drinkers may face is poor quality and taste, which can also be a problem at coffee shops. Many people believe that the beans that a person uses will dictate the quality and taste of coffee brewed at home. While bean quality is a factor that impacts taste, the factor that can overwhelmingly influence the quality and taste of coffee is the method of brewing.

SUMMARY OF THE INVENTION

According to one aspect of the present invention, an apparatus for brewing coffee is disclosed. The apparatus of the present invention comprises a vessel capable of receiving and storing a volume of water, a container for holding an amount of coffee grounds that is positionable within the vessel, and a motor connected to the container. The container is at least partially submerged in the volume of water during brewing. The container and the amount of coffee grounds held therein are agitated in the volume of water at times the motor is actuated.

According to another aspect of the present invention, the apparatus includes a lid that is movable between at least a first position and a second position.

According to a further aspect of the present invention, the motor is secured to the lid such that the motor is generally above the amount of water at times the lid is in the first position and the motor is spaced from the vessel when the lid is in the second position.

One advantage of the present invention is that the water temperature is maintained at a desirable temperature throughout the brewing process.

Another advantage of the present invention is that the coffee grounds are agitated during the coffee brewing process. The motor is conveniently positioned above the water during the brewing process, but movable so that the user can easily add water and/or replace coffee grounds from the apparatus.

These and other advantages will be apparent to one of skill in the art in light of the present disclosure and drawings.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 21A illustrates a perspective view of the motorized actuator assembly and universal joint, in accordance with aspects of the disclosure of the third embodiment of the present invention.

FIG. 21B illustrates an illustrative schematic configuration of a universal joint, in accordance with aspects of the disclosure of the third embodiment of the present invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The Science of Making Coffee

Figure 1:
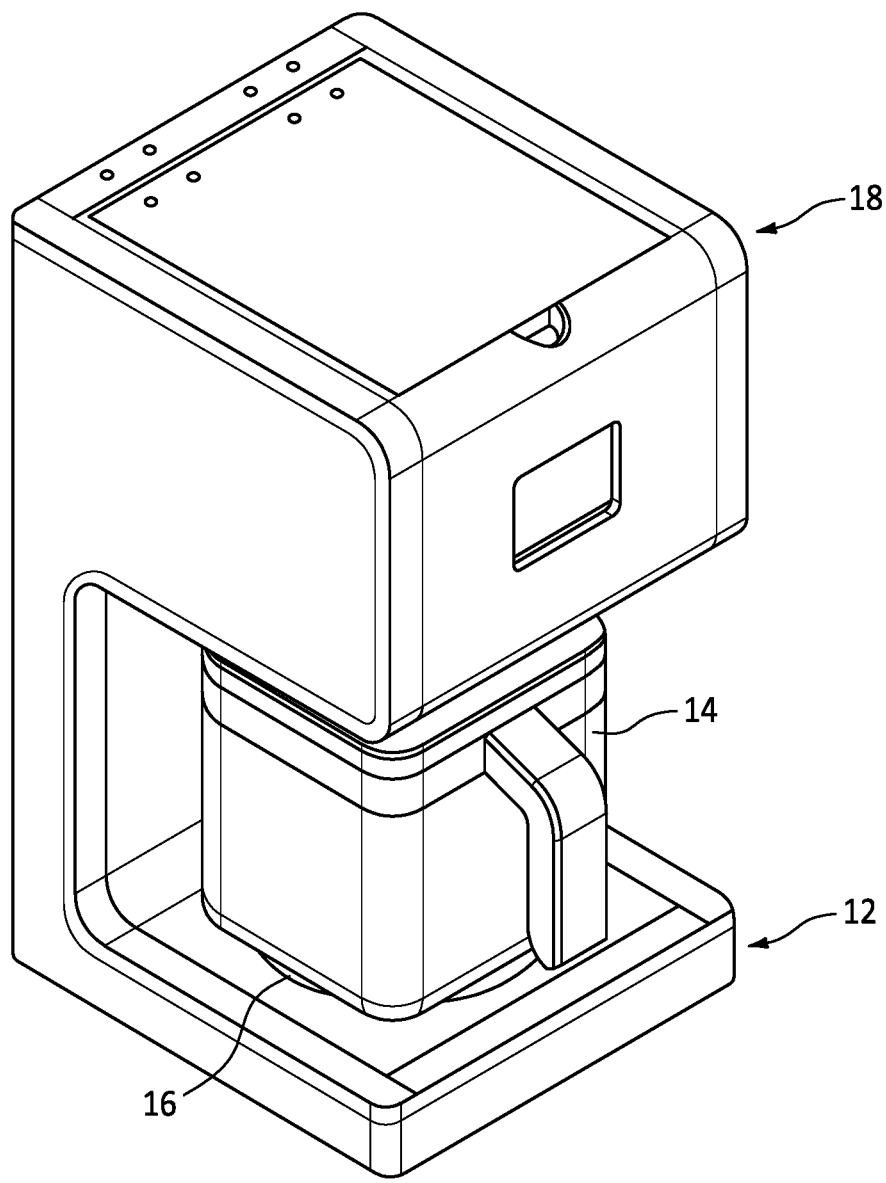
FIG. 1 shows an isometric view of the apparatus of the first embodiment of the present invention.

Humans have been brewing and drinking coffee for more than 500 years. But over that time, the science of making coffee has not changed significantly. When coffee is "brewed," technically what the user is doing is using hot water to extract natural oil from coffee beans. This oil infuses with the hot water used to extract the oil, and the resultant oil-water mixture is what we refer to as "brewed coffee." (Although "cold brewing" has become popular in recent years, cold brewing coffee involves a wholly different brewing process than is used for brewing hot coffee).

As explained further below, the invention disclosed herein utilizes a process known as "agitated infusion" that is not utilized by any coffee brewing system that is currently available (other than U.S. application Ser. No. 15/688,058, now U.S. Pat. No. 10,729,277, to which this application claims priority). Agitated infusion is the process of immersing coffee grounds in water that is at or about tap temperature, gradually heating the water to approximately boiling, and agitating the grounds within the water while it is heated to approximately boiling. This gradual raising of the water temperature to near 212 degrees F., combined with agitation of the grounds that are fully immersed in the gradually heating water (as explained herein), achieves the maximum extraction of oil from the coffee grounds, which results in two significant advantages: (i) the brewed coffee that is produced is richer in flavor: and (ii) because the infusion process extracts significantly more oil from the coffee grounds than other coffee brewing processes, the user is able to achieve a richer tasting brewed coffee using less coffee grounds, which is more efficient and results in the user saving significant amounts of money. Any variation from the agitation infusion method, such as using water heated to a lower temperature or failing to utilize the gradual heating process and agitation (or any other variation), will result in the brewing process being unable to extract the very high percentage of oil from the grounds that can be extracted using agitated infusion. Failing to fully submerge the grounds in the water during the agitating and heating process, as provided during agitated infusion, will significantly diminish the quality of the brewed coffee.

The industry's most relevant and widely utilized methods of brewing coffee, none of which utilize the agitation infusion process as present invention does, are discussed below.

Turkish Coffee

Turkish coffee is among the oldest methods of brewing coffee and the process of making Turkish coffee is well known. For a good example of the prior art's discussion of Turkish coffee, see WO2007116350 A1 (Suleyman, et al). In short, to make Turkish coffee, the user places water into a carafe (or other receptacle) and places the carafe over heat (such as the flame of a stove or, in past times, the flame of a fire). Then the user heats the water to a medium-high temperature. Once the water reaches that medium-high temperature, the user adds finely ground coffee to the carafe. The user then stirs the coffee within the carafe and allows the water with the coffee therein to continue to heat; this process extracts the oil from the coffee so that the oil begins to mix with the water, which forms brewed coffee. Once the coffee grounds begin to sink, the user stirs the coffee-water mixture again; this stirring extracts even more oil from the coffee grounds and creates a consistent brewed coffee. As the user stirs, the coffee-water mixture should begin to foam up. Once the coffee-water mixture begins to foam, the user stops stirring and removes the coffee-water mixture from heat. After a short time (approximately 30 seconds), the coffee grounds will settle to the bottom of the carafe and the brewed coffee mixture can be carefully poured into cups and served.

French Press

Among widely utilized coffee makers, French Press systems are generally considered to produce the best tasting coffee. In nearly every survey taken of coffee drinkers, the French Press is thought to be the best brewing method. Not surprisingly, many exclusive restaurants use only the French Press method.

A typical example of the French Press process of brewing coffee is disclosed in U.S. Pat. No. 6,422,133 B1 to Brady. Like making Turkish coffee, a French Press system works by immersing ground coffee (freshly ground coffee is preferred, but not necessary) directly into water—but the remainder of the process is different. In a French Press system, the user pours coffee grounds into the empty French Press carafe. After doing so, the user adds water that has been heated to approximately 212 degrees F. The hot water will begin extracting oil from the coffee grounds to form brewed coffee. At this point, some French Press users will stir the grounds within the water in an effort to extract additional oil from the grounds, others do not stir. Whether the grounds are stirred or not, after the water is added the user must wait 3-6 minutes. During this time, the hot water will continue extracting oil from the coffee grounds to create a more robust brewed coffee, but the temperature of the water will decrease quickly and the process of extracting oil will be weakened as the temperature falls. After these 3-6 minutes pass, the user slowly lowers the French Press "plunger" from the top of the carafe to bottom. The head of the plunger is usually designed similar to a "screen," which permits the brewed coffee to pass through while forcing the now used coffee grounds to the bottom of the carafe. Once the brewed coffee is separated from the grounds, the user can pour the coffee out of the carafe and into a mug.

Pour Over

The "pour over" method of brewing coffee is often also lauded as producing high quality coffee. Most often associated with the brand Chemex®, the pour over method involves the steps of heating water to boiling, placing ground coffee within a filter and positioning the filer above a receptacle capable of storing brewed coffee, removing the boiling water from the heat source and pouring it over the coffee grounds so that the water flows through the grounds and into the receptacle. Most pour over users utilize a specific method of pouring the water over the coffee, which may include multiple pouring steps, in an effort to extract the maximum amount of oil from the grounds.

Drip Brewing Systems

There is no doubt that the most utilized coffee brewing system today is the "drip"; drip coffee makers have been a mainstay in the majority of American homes for decades. The standard drip system is described in U.S. Pat. No. 5,001,969 to Moore, et al and brews coffee by spraying hot water over coffee grounds that are held in a filtered basket situated above a carafe. The sprayed hot water trickles downward through the grounds and as it does so the hot water extracts and mixes with the oil from the coffee grounds. There is an opening in the bottom of the basket that houses the filtered coffee grounds. When the water trickling downward through the basket reaches the bottom (and by this time has extracted and mixed with oil from the coffee grounds), the now-formed brewed coffee exits the basket through a hole in the basket's bottom and empties (i.e., drips) into a carafe (or other storage receptacle) that stores the coffee until the user transfers it into a mug for drinking. The storage receptacle usually includes a means for keeping the receptacle and brewed coffee heated. For standard drip systems that utilize a carafe for storing the coffee, the carafe often rests atop a hot plate that keeps the brewed coffee warm.

There are many variations of drip systems designed to suit user preferences and to enhance the quality of the coffee that drip makers brew. For example, U.S. Pat. No. 5,001,969 discloses a drip system that includes timers to permit and regulate automatic brewing cycles that allow the system to brew coffee even when the user is not present. U.S. Pat. No. 4,406,217 to Oota discloses a drip system that includes a mill to grind coffee immediately prior to brewing, the idea being that freshly ground coffee will produce more flavorful coffee. Other variations of drip systems maintain a reservoir of hot water that can be immediately sprayed over the coffee grounds so that the user does not have to wait for water to be heated or an internal "tank" where the brewed coffee is stored, as opposed to a carafe, and the user opens a spigot (or performs a similar function) and the coffee-water mixture drains from the "tank" into the user's mug. This saves the user the trouble of washing a carafe. Despite how drip system may be varied or the "bells and whistles" that may be included for user preference, the majority of drip systems still employ the same process to brew coffee: spraying heated water over coffee grounds, with the water eventually draining into a receptacle from which the coffee is then transferred to the user's mug.

There are, however, a minority one drip system that utilizes a form agitation to brew higher quality coffee. For example, U.S. Pat. No. 6,532,862 to Mork, et al discloses a drip system that utilizes a spinning basket to create centrifugal forces to more thoroughly infuse the coffee grounds with water. Mork also notes additional prior art that utilizes centrifugal forces to more thoroughly infuse the coffee grounds, such as U.S. Pat. No. 5,265,617 to Gilbert and U.S. Pat. No. 1,602,632 to Zorn. Cuisinart has also recently release its DCB-10 Automatic Cold Brewing System, which uses agitation to "cold brew" coffee at a pace that, the company claims, can produce quality cold brew coffee in less than one hour. Because cold brewing uses water that is not heated, the process usually requires far longer to brew coffee than is required to brew hot coffee because cooler water less able to extract oil from coffee than hot water. For example, many cold brew coffees are brewed for several hours or even overnight. The Cuisinart DCB-10 system claims that, through its agitation process, it can brew quality cold brew coffee in less than one hour. As explained further below, even these systems that utilize agitation and infusion do so in a manner unlike and inferior to the invention disclosed herein.

Single-Cup Coffee Brewers

Single-cup coffee makers, such as the Keurig brewing system that is covered by numerous US patents, including U.S. Pat. Nos. 7,398,726; 7,165,488; 7,347,138; D513,572; 7,377,162; D544,299; 7,360,418; 7,513,192; 8,151,694, have over the last several years become extremely popular because of their convenience and speed. Rather than requiring the user to place coffee grounds in a basket or directly into water within a carafe, single-cup coffee makers use coffee "pods" (these coffee pods are commonly referred to as "K-cups"). The coffee pods are a single-use, premeasured and prepackaged amount of coffee grounds that may be used to brew a single cup of coffee (as opposed to multiple cups of coffee, which can be brewed using the Turkish, French Press, and drip systems discussed above). Single-cup coffee makers heat water to approximately 192 degrees F. before it inundates the grounds. To initiate the brewing process, a user opens the system's coffee pod chamber and places a pod into the chamber. Next, the user closes the chamber. The chamber is designed so that by closing the chamber with a coffee pod therein, the chamber's structure will pierce the upper portion of the coffee pod from above and pierce the lower portion of the coffee pod from below.

Once the chamber is closed, the user can begin the coffee brewing process, which is usually done simply by pressing a "start" button. This causes the system to pump heated water into the chamber. When the water enters the chamber, it enters the coffee pod via the opening in the pod's upper portion that was created when the chamber closed. Once the water enters the pod, it inundates the coffee grounds contained therein, which extracts and mixes with oil from the grounds to create brewed coffee. The force of water being pumped into the chamber, as well as gravity, force the brewed coffee to flow out of the opening in the bottom of the pod, which is situated above an opening in the bottom of the chamber, and the brewed coffee then flows out of the machine and into the user's mug, which is situated below the opening in the bottom of the chamber.

Percolators

The modern iteration of a percolator coffee maker was patented in 1889 by an Illinois farmer named Hanson Goodrich, see U.S. Pat. No. 408,707 (other iterations of percolators are thought to have been utilized as long ago as 1810). In modern percolators (hereafter "percolators"), which have changed little if at all since Hanson Goodrich, the entire brewing process occurs within a carafe; the design and process is as follows: The carafe must be fabricated using material that can withstand and transfer high levels of heat; metal is generally preferred; The carafe has a removable lid; Toward the top of the inside of the carafe, but not at the top of the carafe, there is a chamber (often made from metal mesh); The chamber is typically donut-shaped, so that there is an opening in the middle; Tubing (like a pipe) extends from the opening in the middle of the chamber, downward, toward the bottom of the carafe, but the tubing does not reach or contact the bottom of the carafe; A user pours a desired amount of water into the carafe; The user places a desired amount of coffee grounds in the chamber (there are commercially available "packets" of coffee grounds for use in percolators; the packets are typically made of the same material as coffee filters, contain a premeasured amount of coffee grounds, and are often donut-shaped, like the chamber, which can be significant, as explained below); The user then places the carafe over a heat source, which today is generally the flame (or electric burner) of a kitchen stove; The user adjusts the heat so that the water within the carafe rises to boiling or approximately boiling; As the temperature of the water approaches boiling, the water (some of which will transition to a gaseous or semi-gaseous state) travels up the tubing from the bottom of the carafe to the top region of the carafe above the chamber that holds the coffee grounds; When the water reaches the top region of the carafe, it falls downward due to gravity and any water that has transitioned to a gaseous or semi-gaseous state condenses in the carafe's top region, returning to a liquid state, and falls downward due to gravity; When the water falls downward, it falls atop the coffee grounds or the packet of coffee grounds that is held in the chamber; The falling water then trickles through the grounds, extracting oil therefrom; When the water (which has mixed with the oil extracted from the grounds) reaches the bottom of the chamber, it falls through the chamber's mesh (or otherwise porous bottom), and mixes with the rest of the water that is in the carafe's bottom region.

As long as the heat remains sufficiently high, the water in the percolator constantly cycles from the bottom of the chamber, up the tubing, and downward through the grounds. The more cycles that the user allows, the more robust the coffee will be.

When the user has permitted the percolator to cycle for a desired amount of time, the user removes the carafe from the heat source. A short period of time after the user has removed the carafe from the heat source, the percolator will stop cycling. The user then pours the coffee that is now stored in the bottom of the carafe into a coffee cup and enjoys the coffee.

Shortcomings of Currently Available Coffee Brewing Systems

Unfortunately for consumers, all of the coffee brewing systems currently available are plagued by significant shortcomings that impair the quality of the coffee they produce or make the systems inconvenient for consumers and relatively expensive. A non-exhaustive discussion of significant shortcomings of each system, many of which the present invention seeks to remedy, are explained below.

Turkish Coffee Shortcomings

For most consumers today, the most significant problem of making Turkish coffee is the inconvenience of the brewing process. It is no coincidence that single-cup brewers have exploded in popularity; in today's on-the-go world, putting a pod into the chamber and pressing start is the easiest way to make coffee. In contrast, Turkish coffee requires multiple steps that are comparatively laborious. The user must heat water and then deposit coffee grounds therein. Then the user must continue heating. Not only does this require work from the user, it also requires vigilance. Unlike drip and single-cup systems, where once the brewing process begins the user can simply wait for the coffee to be ready drink, brewing Turkish coffee requires the user to watch over the process from start to finish. Many if not most Americans simply do not have the time in the morning to devote such vigilance to making coffee, as they are preparing for work; preparing children to go to school; assisting spouses with their morning preparations; or caring for pets—for many Americans, each morning involves a combination of these tasks.

Aside from inconvenience, Turkish coffee also inheres several systemic problems for consumers. For example, if the consumer is not vigilant in the water heating process the grounds can remain in boiling water for too long of a time resulting denatured coffee which can be very bitter Another potential problem is that consumers will pour the brewed coffee from the carafe before the coffee grounds have fully settled, which results in consumers drinking coffee grounds, which is undesirable. Still another problem is clean up. Once the brewing process is complete, the user is left with a carafe full of wet, used coffee grounds that must be discarded and the carafe must be cleaned before it may be used to make more coffee.

As far as taste, the principal problem with Turkish Coffee is that the water used to extra oil from the grounds is generally heated to a medium-hot temperature before the grounds are added or is heated for too long. As explained further, infra, an important aspect of the agitated infusion process disclosed herein is the gradual raising of water temperature while coffee grounds are immersed therein. By beginning the brewing process with water heated to a medium temperature (as opposed to the near boiling temperature water that many of the other brewing processes discussed herein utilize), Turkish coffee does, more than any other method of brewing coffee available to consumers to date, utilize the infusion process—but only to a relatively minor degree as compared to the present invention.

French Press Shortcomings

French Press systems suffer from the same convenience problems that plague Turkish coffee: the user must manually heat water, add grounds, and remain vigilant until the process is complete, and cleanup is inconvenient. In addition, most French press carafes are much smaller than drip system carafes. Because the size of the carafe is smaller, and the work and time involved to brew French Press coffee, if a person has house guests (or otherwise needs to make coffee for more than one or two people), a French press system will generally be undesirable. Also French Press coffee makers do not have heating elements to keep the brewed coffee hot.

French Press systems also fail to take advantage of the infusion process. As noted above, when a user pours preheated water into the French Press carafe, the water is already heated to approximately 200+ degrees F. Although infusing the grounds in water heated to 200+ degrees F. will extract more oil than lower temperature coffee brewing methods (such as drip systems and single-cup systems, see infra), failing to employ the infusion process that involves gradually raising the water's temperature and constant agitation means French Press systems will not extract the maximum amount of oil from the grounds, which means the brewed coffee will not be as robust in flavor as it could be. In addition, the water used to brew coffee using a French Press begins to immediately cool once it is removed from the heat source, which further reduces the ability of French Press systems to extract maximum oil from the coffee grounds.

Pour Over Shortcomings

The pour over method suffers shortcomings inherent to both the Turkish method and French Press systems. For one, the user has to undergo the inconvenient process of separately heating water before coffee can be made. Second, the heated water begins to cool as soon as it is removed from the heat, reducing the pour over method's ability to extract oil from the grounds. In addition (and again like French Press), many pour over carafes hold a smaller volume of coffee and lack a heating element (although some pour over carafes are specifically designed so that they may be placed on top of a stove to keep the coffee warm, but this remains a far cry from the heating elements included in some systems, such as those included in many drips).

The pour over method also lacks true agitation. The coffee grounds merely sit stationary in the filter while water is poured over them. And even altering the pouring method does not result in true agitation or immersion.

Drip System Shortcomings

Most drip systems inheres a host of shortcomings. First, the water temperature of most standard drip coffee makers is heated no higher than 170 degrees F. before it is sprayed over the coffee grounds. This poses two problems. First, by merely preheating water to 170 degrees F. and spraying it over grounds, drip systems fail to in any way take advantage of the infusion process. Second, water that is heated to 170 degrees F. is not hot enough to extract anywhere close to the maximum amount of oil from the coffee. To extract the maximum amount of oil, the water temperature must reach approximately boiling. Further, the water begins to cool quickly after being sprayed on to the grounds, which further impairs the ability of most drip systems to extract oil from the grounds.

The second major problem with most drip coffee makers is the process by which they extract the coffee oil. To extract the maximum amount of oil, coffee grounds should be immersed in water and agitated. But most drip systems simply spray hot water on to grounds, which is referred to as "washing" the grounds. When grounds are merely washed in a drip system, the water sometimes only washes the grounds directly below or very close to the nozzle from which the water is sprayed (many drip coffee makers have numerous nozzles). As a result, there are instances when only a fraction of the coffee grounds are fully washed. This means that oil is extracted from only a fraction of the grounds and the coffee brewed therefrom is only a fraction as flavorful as it would be if all of the grounds were completely washed. Besides dampening the coffee's flavor, the inability of most drip systems to extract oil from all of the coffee grounds means that consumers are wasting large amounts of money on coffee grounds that are never actually used to brew coffee. For consumers that buy high quality beans, the day-in, day-out waste of "unused" grounds can equate to a significant amount of wasted income. So in sum, drip brewers force consumers to overspend to brew coffee that has a dampened flavor.

As noted above, a minority of drip systems incorporate a process by which centrifugal force circulates water through the grounds. While this may be an improvement over the spraying and washing method, it is still less effective at extracting oil than the agitation and infusion method disclosed herein. In addition, the centrifugal processes do not employ the gradual heating process disclosed herein; the water in those systems is heated prior to circulating through the grounds. See, e.g., U.S. Pat. No. 6,532,862 to Mork.

Single-Cup System Shortcomings

As noted above, single-cup brewing systems inundate the grounds in the pods with water that is preheated to 192 degrees F. While water heated to 192 degrees F. will extract more oil from the grounds than water heated to 178 degrees F., 192 degrees F. is still below the ideal approximately boiling temperature. And like other methods of brewing coffee, because the water is pre-heated to 192 degrees F. before inundating the grounds, single-cup brewing systems fail to utilize the gradual heating that is involved in the infusion process.

And, of course, single-cup systems only brew a single cup of coffee at a time. While this is often convenient, if a person has house guests or needs to make coffee for many, reliance solely on a single-cup system can be inconvenient. Finally, single-cup systems are generally considered bad for the environment because their use generates millions of used plastic pods that must be discarded.

Percolator Shortcomings

Like the French Press and pour over, percolator systems require significantly more time, effort, and vigilance than most coffee drinkers are willing to expend. The heat employed to cause the water to rise through the tubing must be monitored, as must the length of time that the user allows the percolator to cycle, because permitting the water within the percolator to reach too high a heat or to heat for too long may result in the coffee oils breaking down, which results in poor taste. In addition, if a user does not use packets of coffee in the percolator, but instead adds coarse-ground coffee grounds directly to the chamber (which is commonly done), there is a high likelihood that some of the coffee grounds will fall through the openings in the chamber's bottom. This will ultimately result in the grounds being in the coffee when the user drinks it, which is undesirable Percolators also fail to employ any aspect of agitated infusion. Like a drip system, water merely trickles down through and washes the grounds—it does not inundate the grounds. Further, there is no agitation; the grounds merely sit in the chamber while being washed.

As an initial matter, in order to clearly describe the current technology it will become necessary to select certain terminology when referring to and describing relevant components within the coffee or beverage brewing industry. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

The present invention combines all of the best practices (some detailed earlier) for brewing coffee into a single system. But before describing the components of the present invention for brewing coffee, it is important to describe how coffee grounds are used in the present invention. Several embodiments are shown and disclosed herein. For example, a first embodiment is shown and described in FIGS. 1-8, a second embodiment is shown and described in FIGS. 9-17B, and a third embodiment is shown and described in FIGS. 18-23.

The Packet

Figure 8:
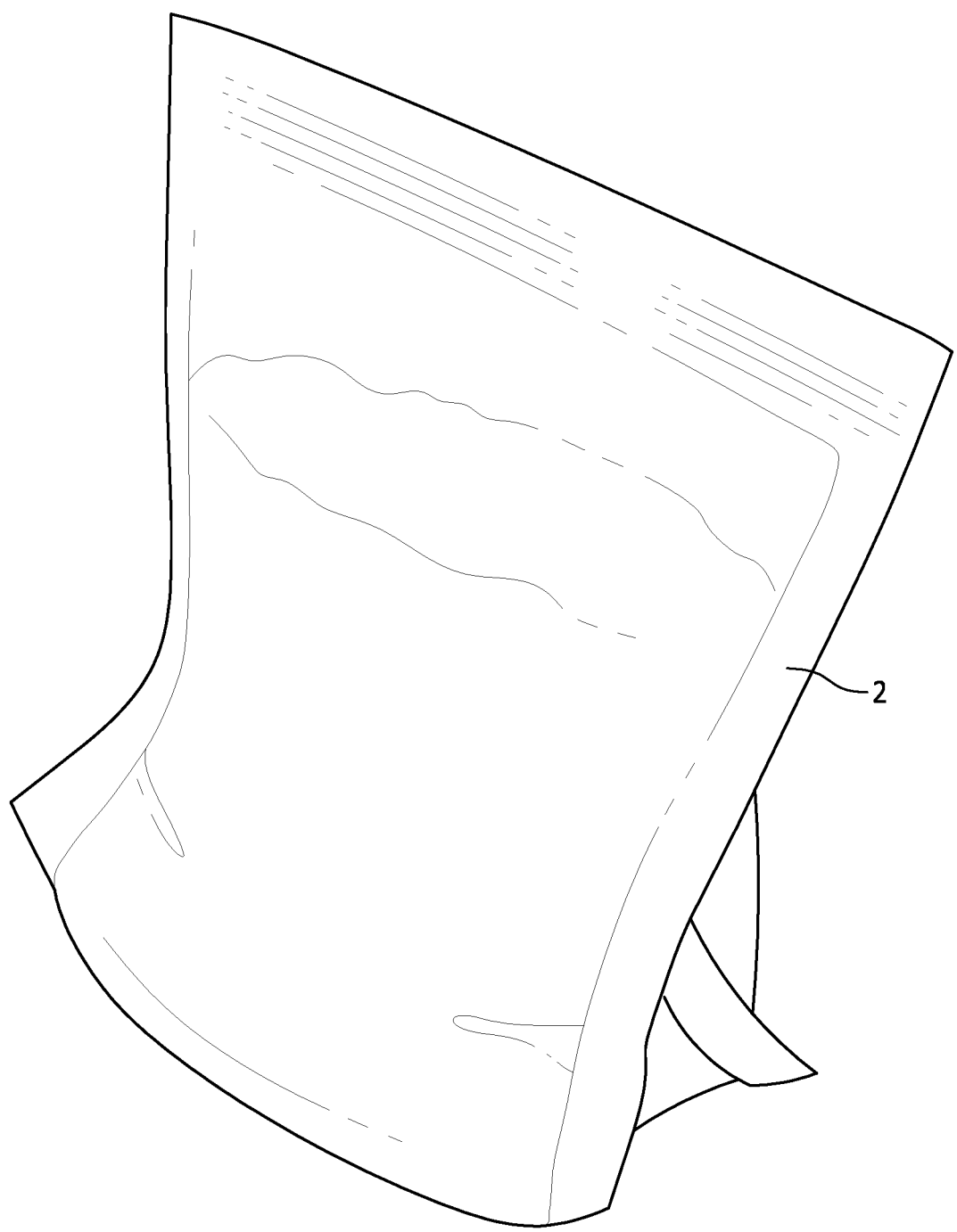
FIG. 8 shows the packet in which coffee grounds are stored of the all of the embodiments of the present invention.

The present invention utilizes coffee grounds that are stored within a "packet." An example of the packet that can be used with the first or second embodiment is shown in FIG. 8. The packet 2, 52 resembles an envelope. Packets with pre-measured amounts of coffee will be available for consumers. However, packets will also be available that will permit users to add an amount of coffee that they prefer. It is critical that the packet 2, 52 be manufactured from a material that will permit water and the oil derived from the grounds to pass through the packet's material, but will not allow the grounds to escape the packet 2, 52. There are numerous types of materials that will allow water and oil to pass through but will keep the coffee grounds from escaping, and those of skill in the art will recognize such materials may be used to manufacture the packet 2, 52. In a preferred embodiment, the packet 2, 52 is comprised of material similar to or the same as the material that comprises coffee filters commonly used in the art. Suitable materials (some of which are currently used as coffee filters) include bleached paper, bamboo, nylon or even gold.

Brewing System Components

Now speaking of the components that comprise the first embodiment, as shown in FIG. 1, from the outside, the look of the present invention resembles many drip coffee systems currently available. But the components within the present system, which are responsible for brewing the coffee, create a coffee brewing system and method for brewing coffee that are novel to the industry.

Figure 9:
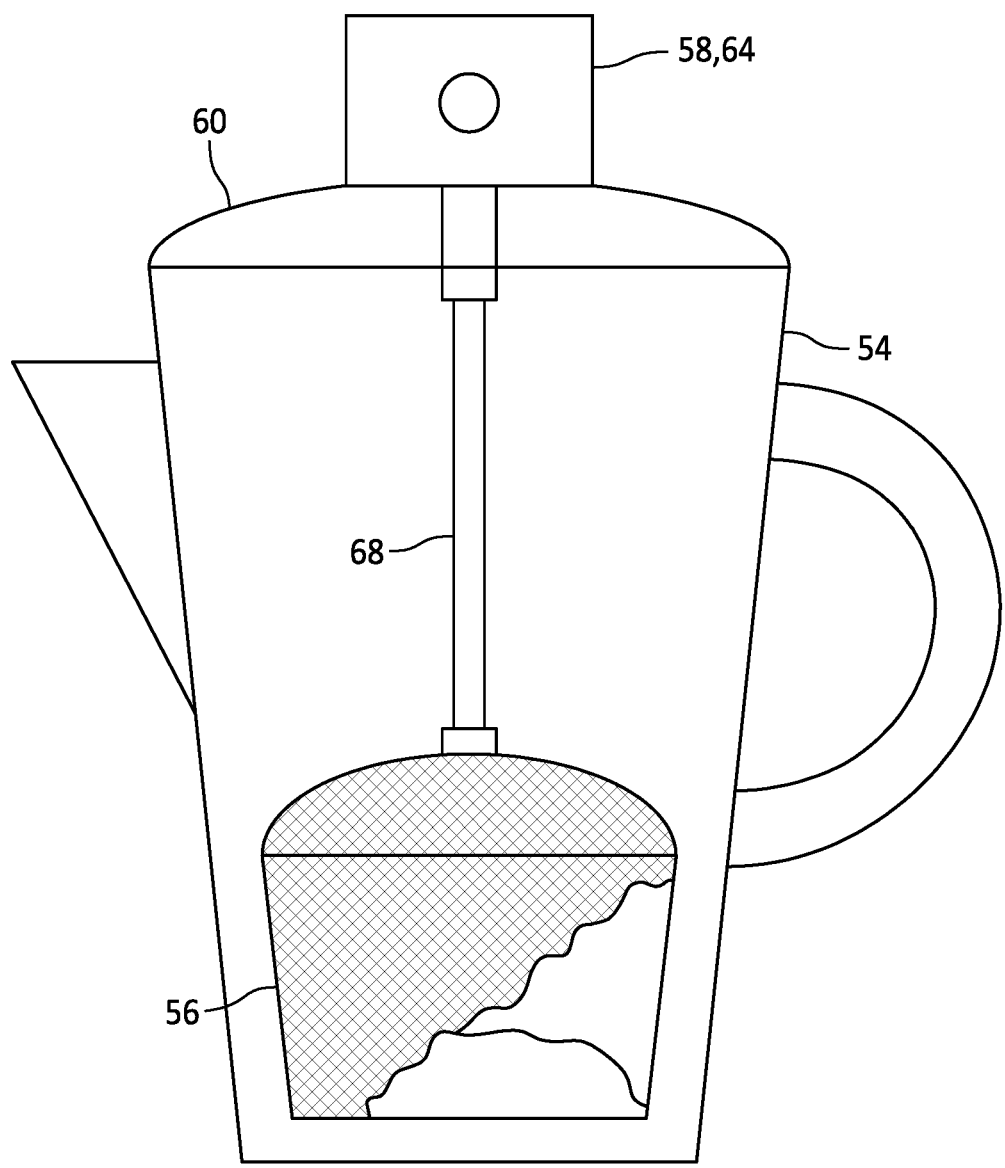
FIG. 9 shows the apparatus of the second embodiment of the present invention.
Figure 10:
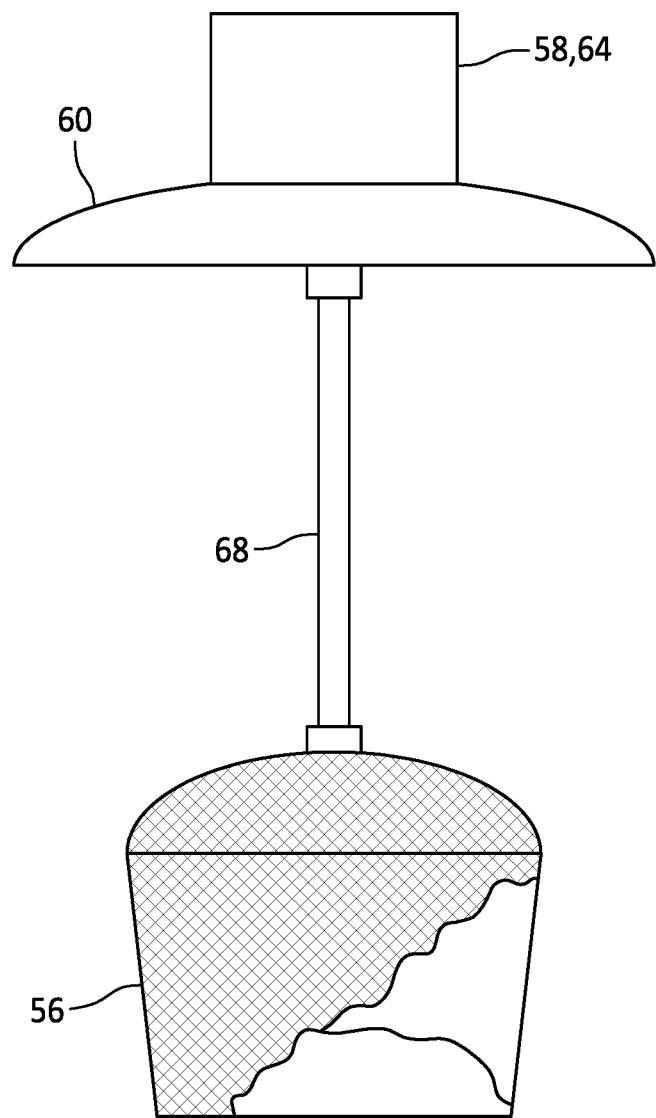
FIG. 10 shows components of the apparatus, including the basket and means for agitating the basket of the second embodiment of the present invention.
Figure 11:
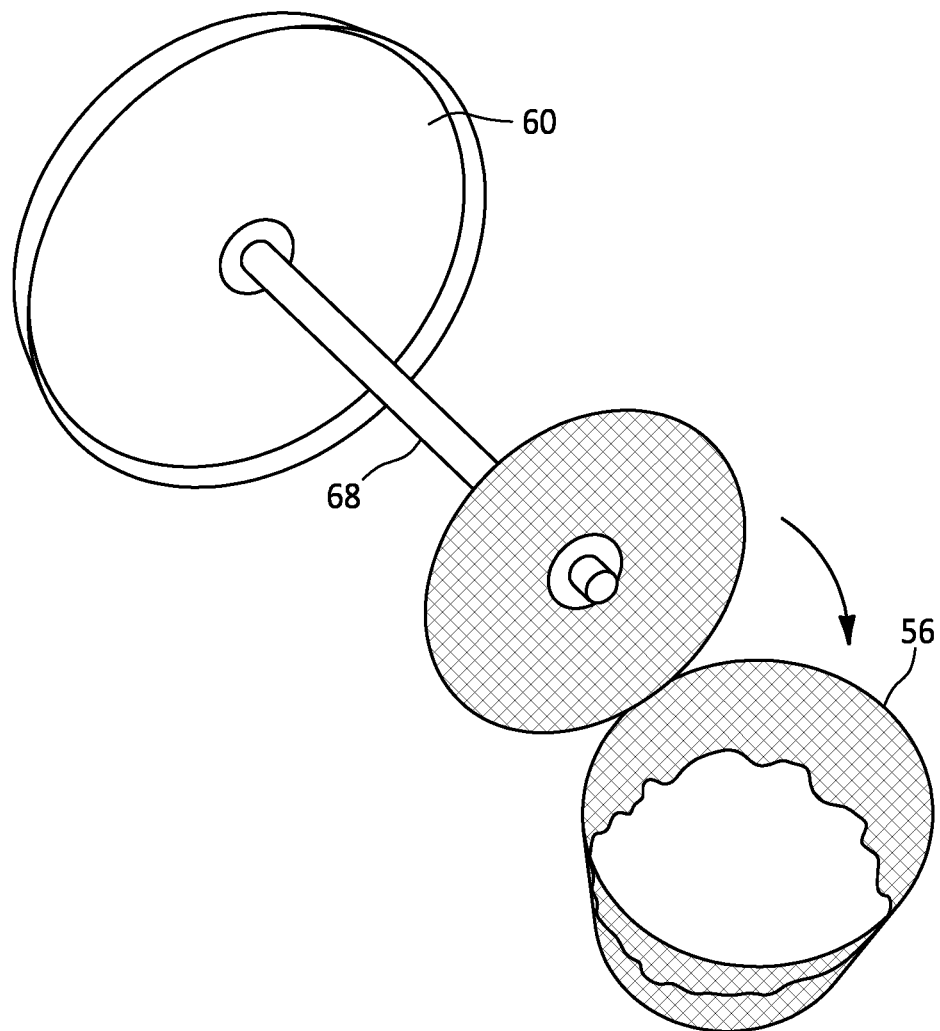
FIG. 11 shows components of the apparatus and how the basket may be opened in the second embodiment of the present invention.

With respect to the components of the second embodiment, as shown in FIG. 9, from the outside, the look of the present invention resembles percolator systems currently available. But the components within the present system, which are responsible for brewing the coffee, create a coffee brewing system and method for brewing coffee that are novel to the industry.

Structure Generally

Figure 3:
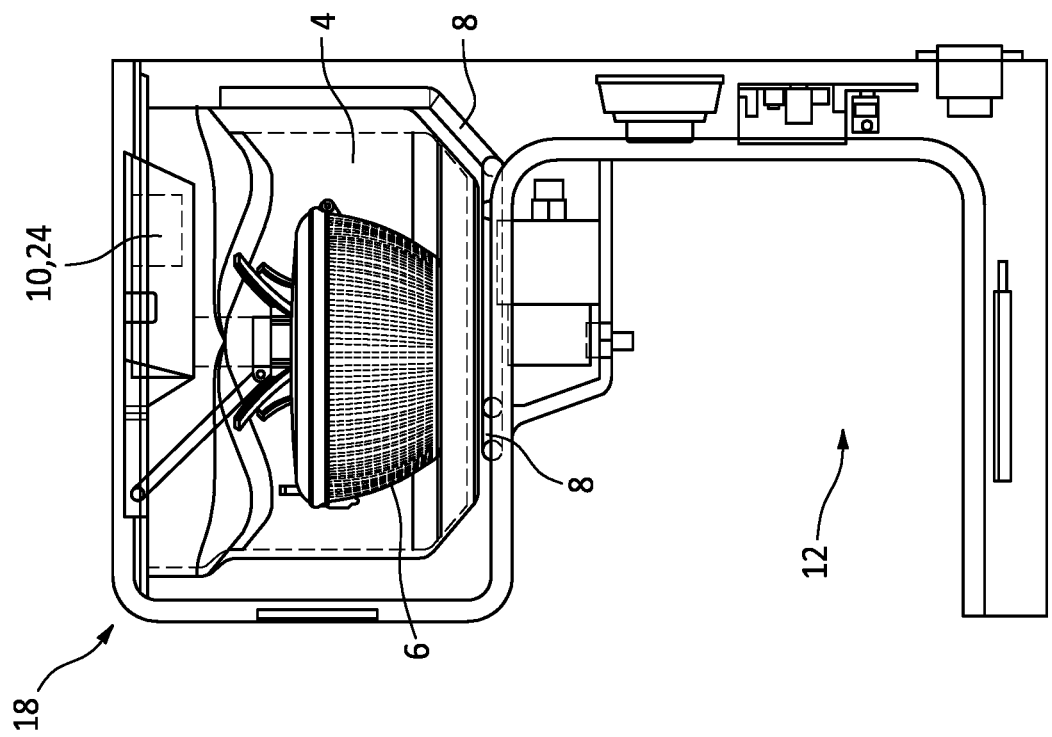
FIG. 3 shows a cross sectional view of the apparatus of the first embodiment of the present invention.
Figure 2:
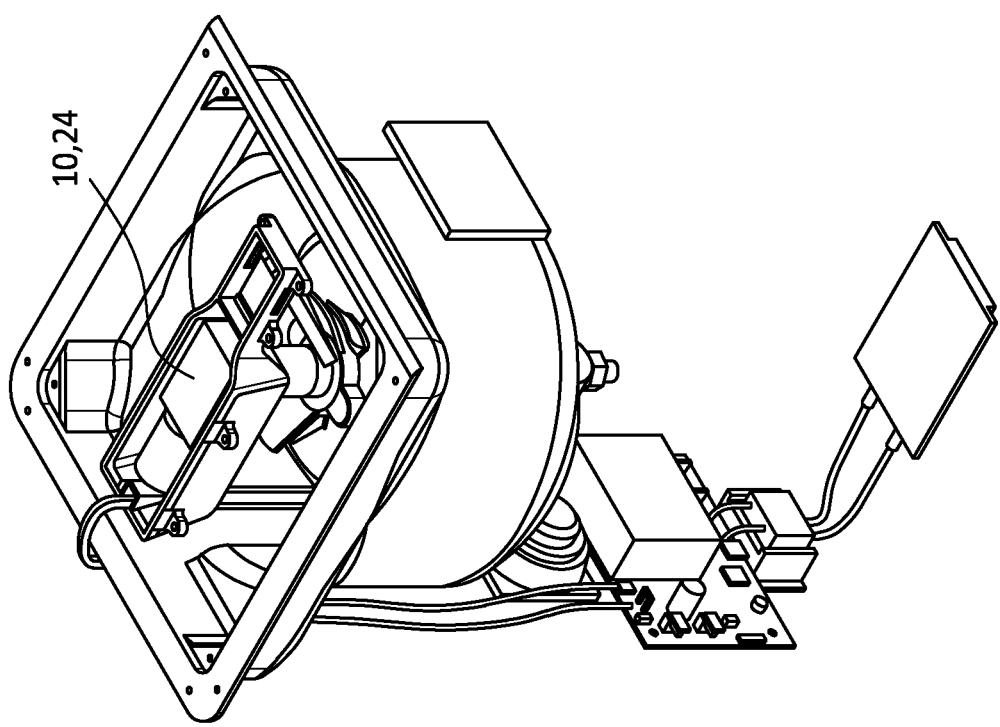
FIG. 2 shows a view of the means for agitating the basket stored within the water chamber of the first embodiment of the present invention.

With respect to the first embodiment, as shown in FIG. 3, the includes a free standing structure that includes an "upper portion" 18 that houses a water chamber 4, basket 6, heating means 8, and a means for agitating the basket 10. The invention also includes a "lower portion" 12 that is fashioned so that a carafe 14 (see FIG. 1) or other storage receptacle (including a user's mug) may be situated below the water chamber 4 that is located within the upper portion. The lower portion may optionally include a means 16 (see FIG. 1) for keeping warm any liquid that is stored in the storage receptacle that may be placed below the water chamber.

As shown in FIG. 9, the second embodiment includes a carafe 54 that is similar or identical to the carafe used in a percolator system, a basket 56, and a means for agitating 58 the basket 56. To add water to the carafe, the user merely removes the carafe's lid 60 and pours water therein.

The Basket

Figure 4:
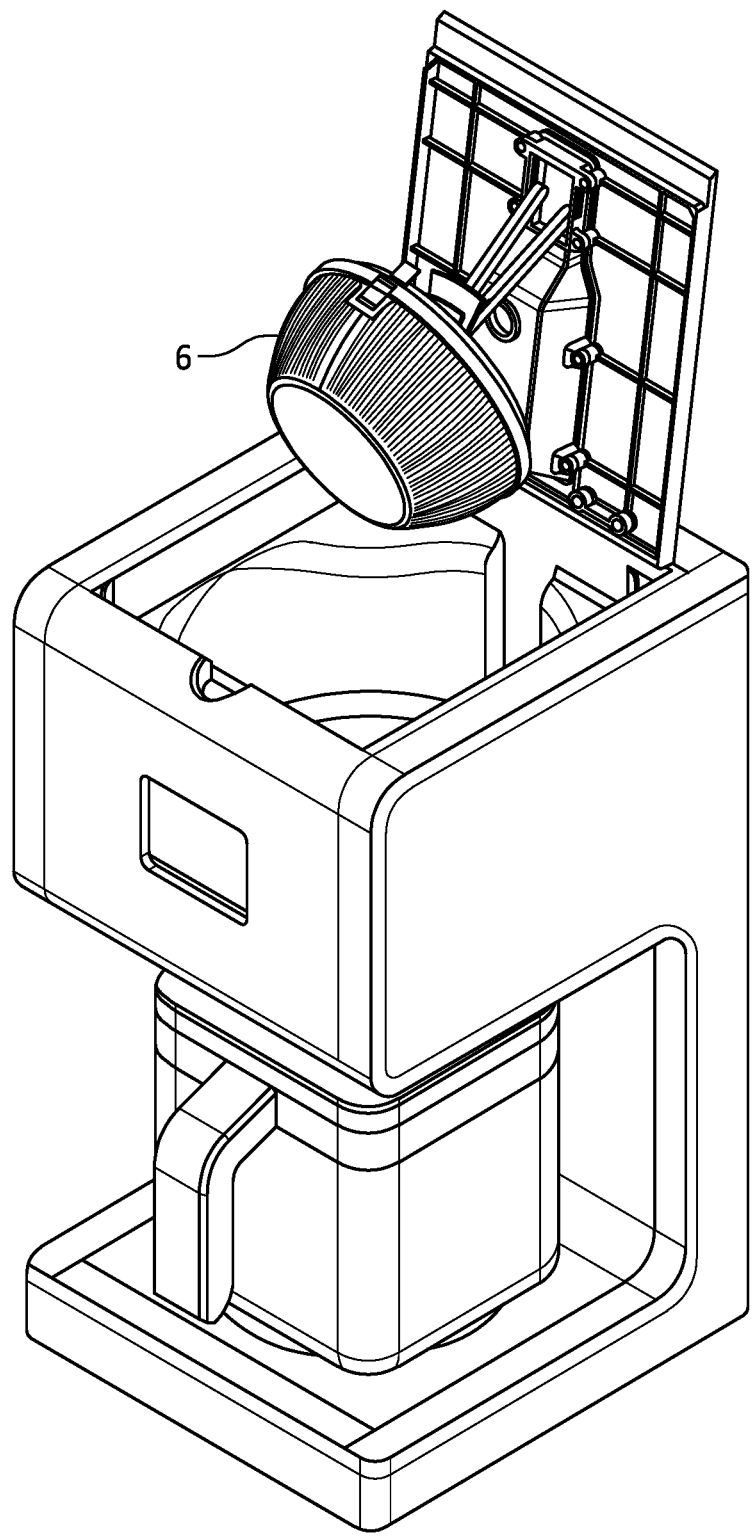
FIG. 4 shows an isometric view of the apparatus of the first embodiment of the present invention and shows how the apparatus may be opened to remove the basket.
Figure 5:
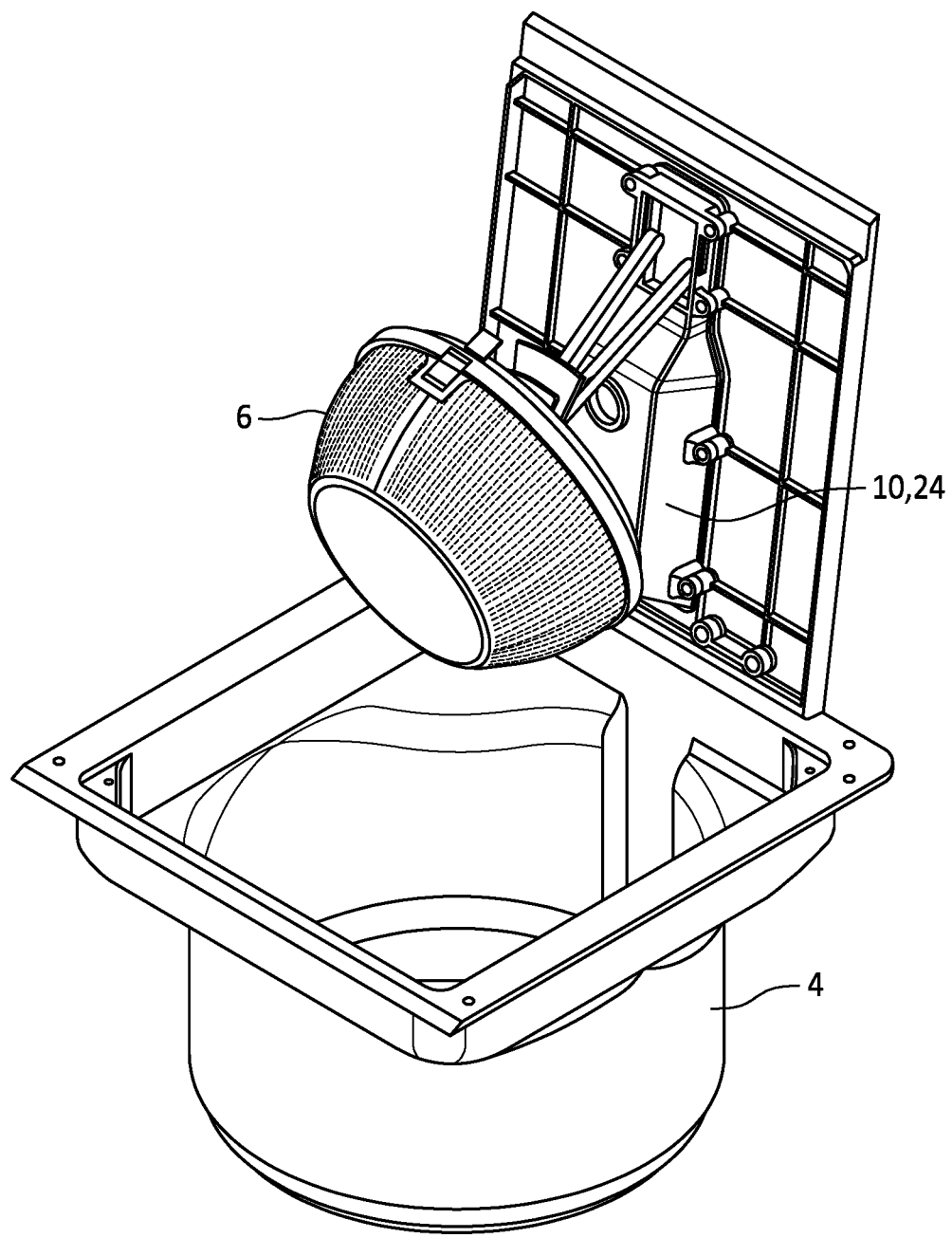
FIG. 5 shows a view of the water chamber, basket, means for agitating, and how the top of the apparatus may open to remove the basket in the first embodiment of the present invention.
Figure 6:
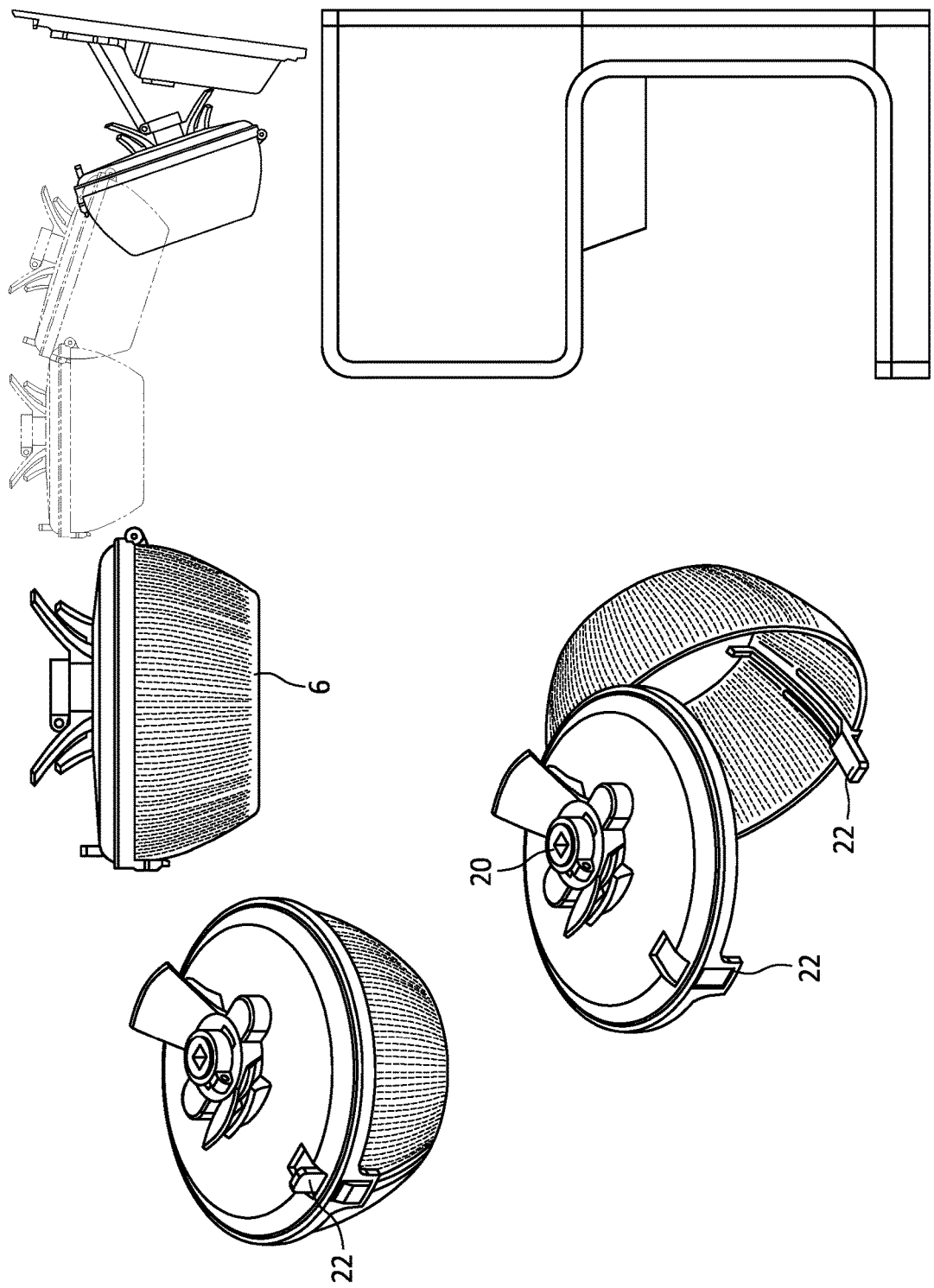
FIG. 6 shows how the basket may be removed from the apparatus in the first embodiment of the present invention.

With respect to the first embodiment, and as shown in multiple FIGS included herewith, the upper portion of the present invention includes a chamber 4 for holding water. The water chamber 4 may be formed in any shape that enables the present invention to function as described and claimed herein. The present invention may be manufactured so that the user accesses the water chamber 4 by opening any portion of system's upper portion, such as a side panel or the system's top panel. FIGS. 4, 5, and 6 show a preferred embodiment wherein the top panel of the upper portion may be opened to access the water chamber 4. For example, it would be suitable for the top panel to be hinged relative to the remainder of the upper portion 18. The water chamber 4 may be manufactured from a variety of materials and those of skill in the art will recognize suitable materials from which to manufacture the water chamber 4. In a preferred embodiment of the invention, the water chamber 4 is manufactured from stainless steel. Manufacturing the water chamber 4 from stainless steel is advantageous because the chamber will be resistant to corrosion and heat damage, which may otherwise pose problems because the present system heats water within the chamber to a high temperature. In addition, the strength of stainless steel permits the water chamber 4 to be manufactured with thinner walls than would be possible using other materials, which results in a cost savings and allows the overall size of the present system to be reduced, which consumers often prefer.

Within the water chamber 4, the present invention includes a "basket" 6 into which the user places the packet of coffee grounds. An example of the basket 6 can be seen in FIGS. 4, 5 and 6. The basket 6 must be manufactured so that a user may insert a packet of coffee grounds into the basket 6 and, when brewing is complete, remove the packet 2 from the basket. Those with skill in the art will recognize that there are numerous ways in which the basket 6 may be manufactured so that the packet 2 can be inserted and removed, and all such numerous ways are considered within the scope of the present invention.

The basket 6 must also be manufactured such that water may enter the basket and inundate the packet. There are numerous methods of manufacturing the basket 6 so that water may enter it to inundate the grounds, and those with skill in the art will recognize that such numerous methods exist (all such numerous methods are considered within the scope of the present invention). In a preferred embodiment shown in FIG. 6, the basket 6 is comprised of wire mesh that permits water to enter and exit the basket 6. Other options include but are not limited to fabricating the basket such that it has "holes" or "slits" that permit water to enter the basket to inundate the packet.

As shown in FIG. 6, the present system may be manufactured so that the basket 6 may be removed from the water chamber 4 (and indeed may be removed from the entire apparatus). Enabling the basket 6 to be removed from the apparatus allows the user to more easily discard the used packet 2 once brewing is complete. Those with skill in the art will recognize that there are numerous means by which the basket 6 may be secured within the water chamber 4 so that it may be removed from the chamber 4 and all such means should be considered within the scope of the present invention. In one possible embodiment shown in FIG. 6, the basket 6 connects to the water chamber 4 via a "universal joint" 20, which is a type of joint well known in the art that allows the basket to be easily disengaged from the water chamber 4 and entirely removed from the system. An additional example of a connection that may be employed is a hooked axle, which also allows the basket to be easily disengaged from the water chamber 4 and entirely removed therefrom. These are, however, only two of the many means of connecting the basket to the water chamber 4 or, as explained below, to a motor that is connected to the water chamber 4, and all such means are considered within the scope of the present invention.

In addition, the basket 6 may be manufactured so that it can easily discard the packet 2. This may be accomplished by numerous methods, all of which are well known in the art and all of which are considered within the scope of the present invention. For example, as shown in FIG. 6, the basket 6 may include a "release latch" 22, whereby when a release button is pressed, the latch is released and the basket 6 opens. Additional types of latches, such as a hook latch may also be used.

Turning now to the second embodiment, the basket 56 operates in a similar manner to the basket 6 of the first embodiment. In this embodiment, the basket 56 also receives the packet of coffee grounds placed therein by the user. An example of the basket 56 can be seen in several FIGS included herewith (for example, FIGS. 9-13). The basket 56 preferably, as was the case in the first embodiment, be manufactured so that a user may insert a packet of coffee grounds into the basket and, when brewing is complete, remove the packet from the basket. Those with skill in the art will recognize that there are numerous ways in which the basket may be manufactured so that the packet 52 can be inserted and removed, and all such numerous ways are considered within the scope of the present invention. Examples of such numerous ways are discussed below and shown in FIGS. 16A, 16B, 17A, and 17B.

The basket 56 must also be designed and manufactured such that water may enter the basket and inundate the packet 52. There are numerous methods of manufacturing the basket so that water may enter it to inundate the grounds, and those with skill in the art will recognize that such numerous methods exist (all such numerous methods are considered within the scope of the present invention). In a preferred embodiment shown in FIG. 12 (as well as in other Figures), the basket 56 is comprised of wire mesh that permits water to enter and exit the basket. Other options include but are not limited to fabricating the basket such that it has "holes" or "slits" that permit water to enter the basket to inundate the packet.

In addition, the basket 56 may be manufactured so that it can easily discard the packet 52 and so that the packet 52 pay be easily placed therein. This may be accomplished by numerous methods, all of which are well known in the art and all of which are considered within the scope of the present invention. For example, as shown in FIGS. 8A and 8B, the basket 56 may include a "release latch" 62, whereby when a release latch 62 is pressed, the latch 62 is released and the basket 56 opens. Other types of latches can be employed as well. For example, a hook latch may also be used. In addition, as shown in FIGS. 9A and 9B, the basket may be manufactured to include a "twist lock." Twist locks are well known in the art; they function such that when one component of an apparatus is inserted into or joined with a second component, and one or both of the components are rotated, the structure of the two components causes the two components to be securely fastened together. Two of the many examples of how twist locks function include threading (similar to the caps of many common bottles of drinking water) or a latching mechanism (such as the release latch mechanism described above).

The basket 56 may be manufactured from a variety of materials and those of skill in the art will recognize suitable materials from which to manufacture the basket. In a preferred embodiment of the invention, the basket is manufactured from stainless steel. Manufacturing the basket from stainless steel is advantageous because the basket will be resistant to corrosion and heat damage, which may otherwise pose problems because the present system heats water within the carafe to a high temperature. In addition, the strength of stainless steel permits the basket to be manufactured with thinner walls than would be possible using other materials, which results in a cost savings, which consumers often prefer. +

As shown in FIGS. 16A, 16B, 17A, and 17B, the present system may be manufactured so that the basket 56 may be removed from the apparatus. Enabling the basket 56 to be removed from the apparatus allows the user to more easily discard the used packet 52 once brewing is complete. Those with skill in the art will recognize that there are numerous means by which the basket 56 may be removed from the apparatus and all such means should be considered within the scope of the present invention. In one possible embodiment (shown in FIG. 4 and discussed supra), the basket 56 connects to the means for agitation 58 by an elongated member 68 (e.g., a shaft). In such embodiment, there are numerous means by which the elongated member may be connected to the basket 56; for example, the basket 56 may be connected to the member 68 via a "universal joint," as described in connection to the first embodiment. Or, as also was described in connection with the first embodiment, a hooked axle could, for example, be utilized.

Agitation

With respect to the present invention generally, agitation is the process of churning or otherwise stirring the coffee grounds while water is extracting oil from the grounds. Examples of agitation rotating, oscillating, moving side-to-side, and bobbing up and down (or any combination thereof). However, the present invention should not be so limited. By sufficiently agitating the grounds during the brewing process, all of the grounds (or at least a significant portion thereof) being used to brew a given batch of coffee have the opportunity to interact with the water. To achieve the greatest results using the infusion method of brewing coffee, the grounds should be agitated while the water gradually heats. The Turkish and French press methods of brewing, discussed above, include (at the user's option) a form of agitation when the user manually stirs the grounds. But as noted above, manually stirring the grounds is highly inconvenient for many users.

The present invention achieves agitation during the brewing process by automatic means that frees the user to perform other tasks while the coffee brews. The present invention does so in the first and second embodiments by agitating the basket 6, 56 within the water chamber 4 of the first embodiment or the carafe 54 of the second embodiment. The agitation takes place while the packet 2, 52 is within the basket 6, 56. There are numerous methods by which one of skill in the art may achieve agitation of the basket 6, 56, and all such methods should be considered within the scope of the present invention.

In the first embodiment, the present invention achieves agitation as follows: (i) a means for agitating the water in the form of a motor 24 is installed generally above the water chamber 4; (ii) the water chamber 4 is filled with water; (iii) the basket 6 is attached to the motor via a universal joint 20; (iv) once the motor 24 is activated, this causes the basket 6 mechanically attached to the motor to rotate around an axis; (v) the rotating of the basket 6 through the water, which is being gradually heated as further described below, causes the coffee grounds in the packet 2 within the basket 6 to churn while fully immersed in the gradually heating water, thereby achieving the desired agitation.

Figure 12:
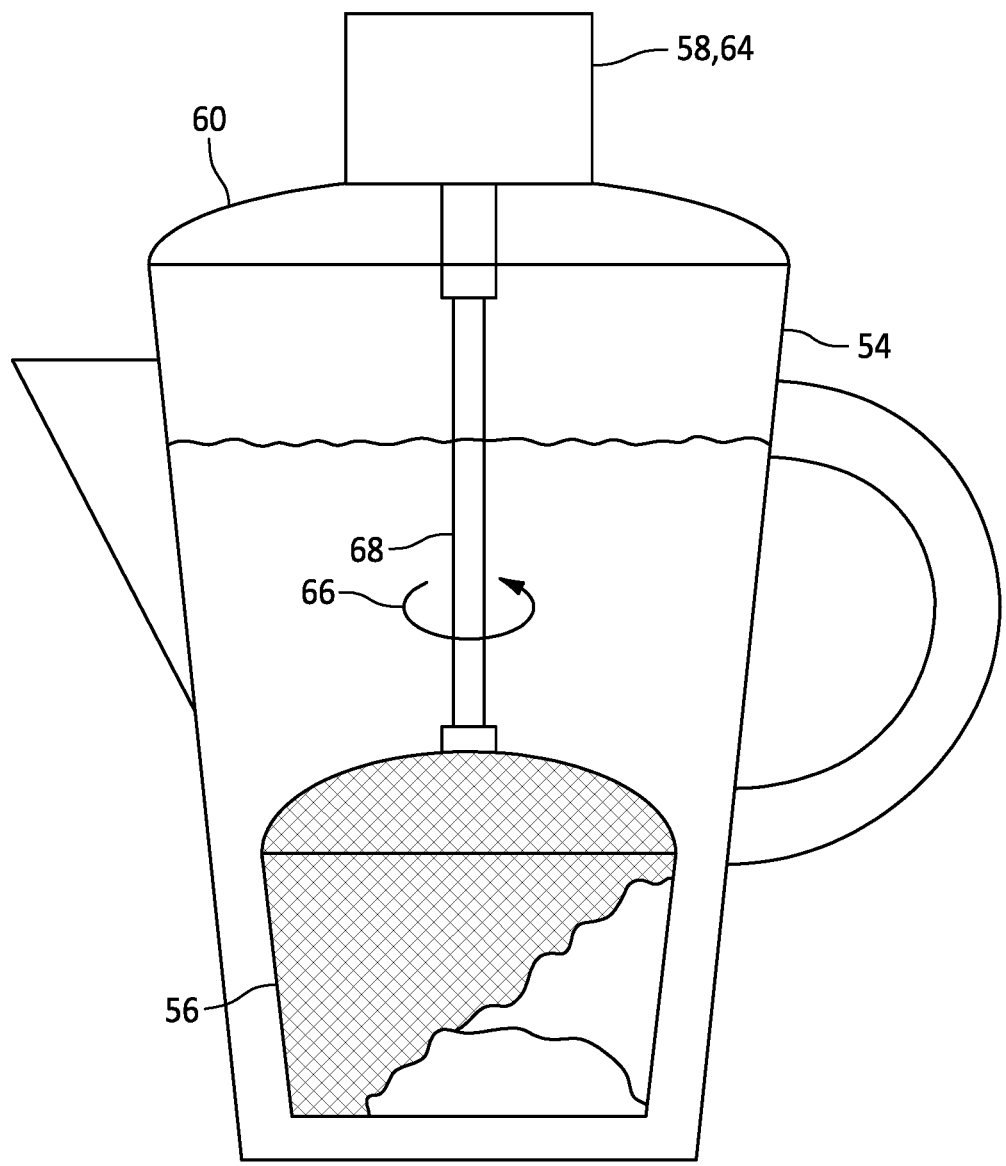
FIG. 12 shows an example of how the components of the apparatus function to achieve agitated infusion in the second embodiment of the present invention.
Figure 13:
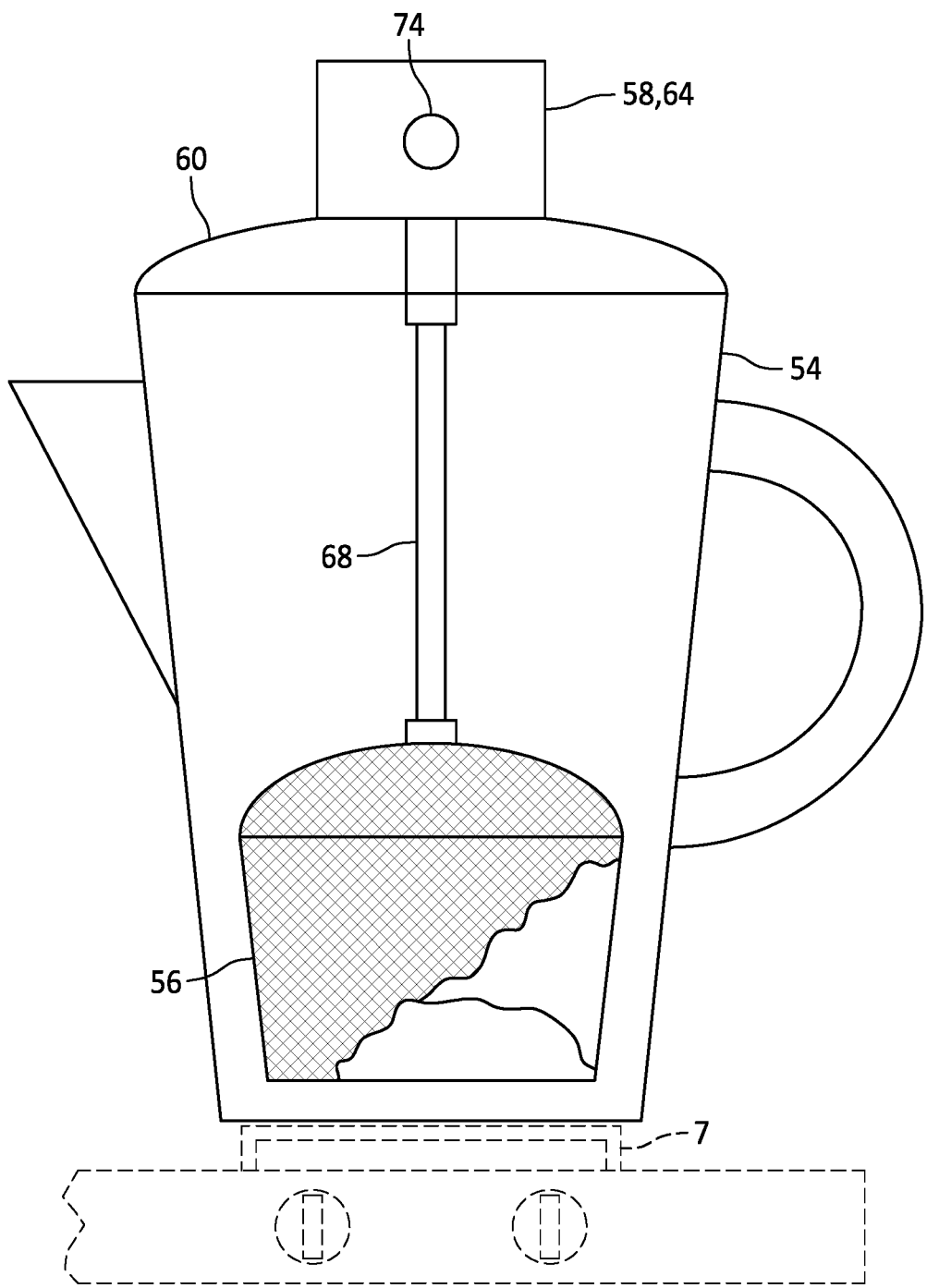
FIG. 13 shows how external heat may be applied to heat water within the apparatus of the second embodiment of the present invention.

In the second embodiment, shown in FIG. 12, the present invention achieves agitation as follows: (i) a motor 64 is affixed to the carafe's lid 60; (ii) the carafe 54 is filled with water (ideally such that the grounds are fully submerged); (iii) the basket 56 is connected to the motor 64; (iv) once the motor 64 is activated, this causes the basket 56 connected to the motor 64 to rotate; (v) the rotating (shown by the arrowed indicated by reference number 66) of the basket 56 through the water, which is being gradually heated from tap temperature to approximately boiling, causes the packet within the basket 56 to churn while fully immersed in the gradually heating water, thereby achieving agitation.

In a preferred embodiment of the invention shown in several FIGS (including FIG. 12), the basket 56 is connected to the motor 64 via an elongated member 68 (e.g., a shaft). The basket 56 is affixed to the bottom end of the member 68 and the top end of the member 4 is affixed to the motor 64. When the motor 64 is activated, the motor 64 causes the elongated member 68 to rotate (see arrow showing rotation indicated by Reference Number 6), which in turn causes the basket 56 affixed to the elongated member 68 to rotate. When the basket 56 spins with the carafe 54 full of heating water and the packet 52 of grounds contained therein, agitated infusion is achieved. However, those with skill in the art will recognize that there are additional methods by which the basket 56 may be connected to a motor 64 such that when the motor 64 is activated agitation is achieved and all such methods should be considered within the scope of the present invention.

Heating Components and Application of Heat

As explained further herein, the water within the water chamber 4 of the first embodiment or the carafe 54 of the second embodiment must be heated from an initial temperature (e.g., tap temperature) to a second temperature that is optimal for brewing coffee. The second temperature is optionally approximately that at which water boils but is most preferably in the between 190 degrees F. and 210 degrees F. However, the heating process preferably occurs relatively quickly because users generally are not willing to wait longer than 6-8 minutes for coffee to brew. If a brewing system takes longer than 6-8 minutes to brew the coffee, many users will opt for a system that brews coffee more quickly.

Figure 7:
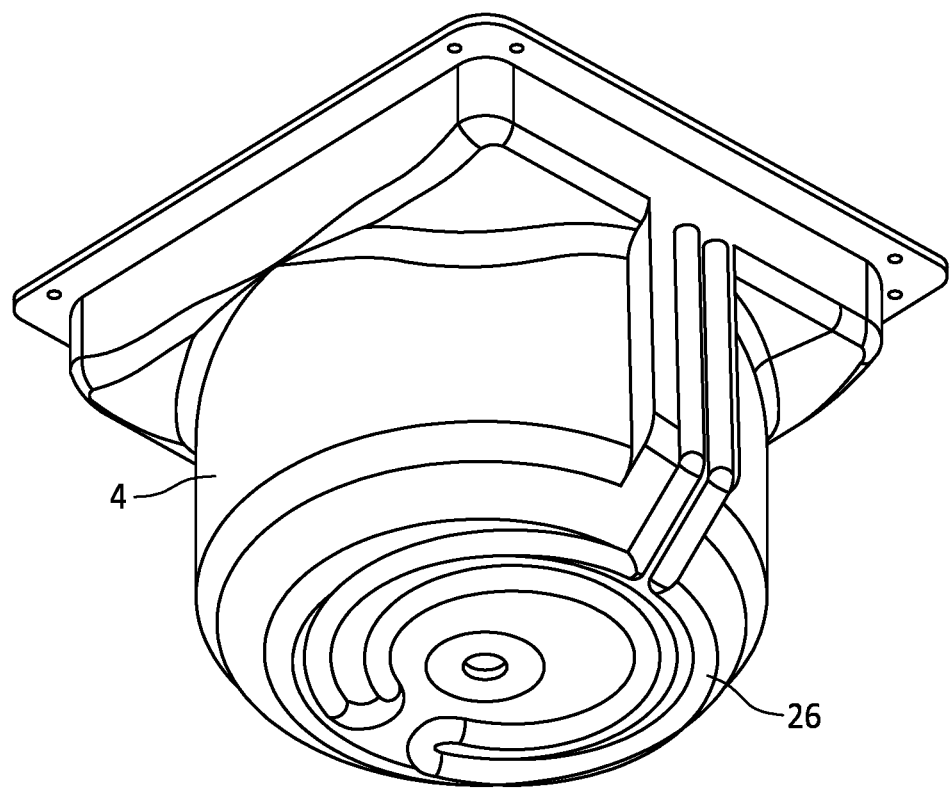
FIG. 7 shows how the means for heating the water chamber may be included in the apparatus of the first embodiment of the present invention.

Referring to the first embodiment, there are numerous methods by which a person with skill in the art can cause the water within the water chamber 4 to heat, and all such methods should be considered within the scope of the present invention. In a preferred embodiment shown in FIG. 7, the present invention includes copper coiling 26 that is in contact with the water chamber 4. In FIG. 7, the copper coiling 26 (or other heat source) is in contact with the bottom of the water chamber 4, but the copper coiling may be in contact with any portion of the water chamber 4, so long as the placement of the copper coiling 26 (or other heat source) does not interfere with the present system's operation (for example, the copper coiling may be placed in contact with the sides of the water chamber).

The process of using copper coils to conduct heat is well known in the art. In short, electricity passes through the copper coils, causing them to heat, and the heat of the copper coils is then transferred to the water chamber as a result of the coils contacting the chamber's exterior. Once the chamber itself begins to heat, the heat transfers from chamber to the water stored therein. In a preferred embodiment of the present invention, 1200-1500 watts of electricity should be used to heat the water chamber, as this amount energy will gradually heat the water in the chamber from tap temperature to approximately boiling within the 6-8 minutes time frame in which coffee should be brewed.

With respect to the second embodiment, there are numerous methods by which a person with skill in the art can cause the water within the carafe 54 to heat to the second temperature at which it is desirable to brew coffee, and all such methods should be considered within the scope of the present invention. The present invention may include an element for heating or may rely on external heat sources. In an embodiment shown in FIG. 13, the present invention does not include any heating element and relies on an external heat sources 70, such as the heat generated by a user's stove. When using this embodiment of the present invention, the user places the carafe 1 on a stove burner 70 (or other heat source) and adjusts the heat from a stove burner 70 (or other heat source) such that the heat will be sufficient to raise the temperature of the water from tap temperature to approximately boiling and more preferably to between 190 degrees F. and 210 degrees F.

The apparatus may include a means for monitoring the temperature of the water and alerting the user when the user should reduce or cease applying heat to the apparatus. One such means includes using a thermometer, similar to a meat thermometer or other thermometers, that monitors the heat of the water within the carafe and displays the temperature on the outside of the apparatus. If a thermometer is used, the user must vigilantly monitor the thermometer; possess the knowledge regarding when heat should be removed or reduce; and reduce or remove the heat accordingly.

Figure 14:
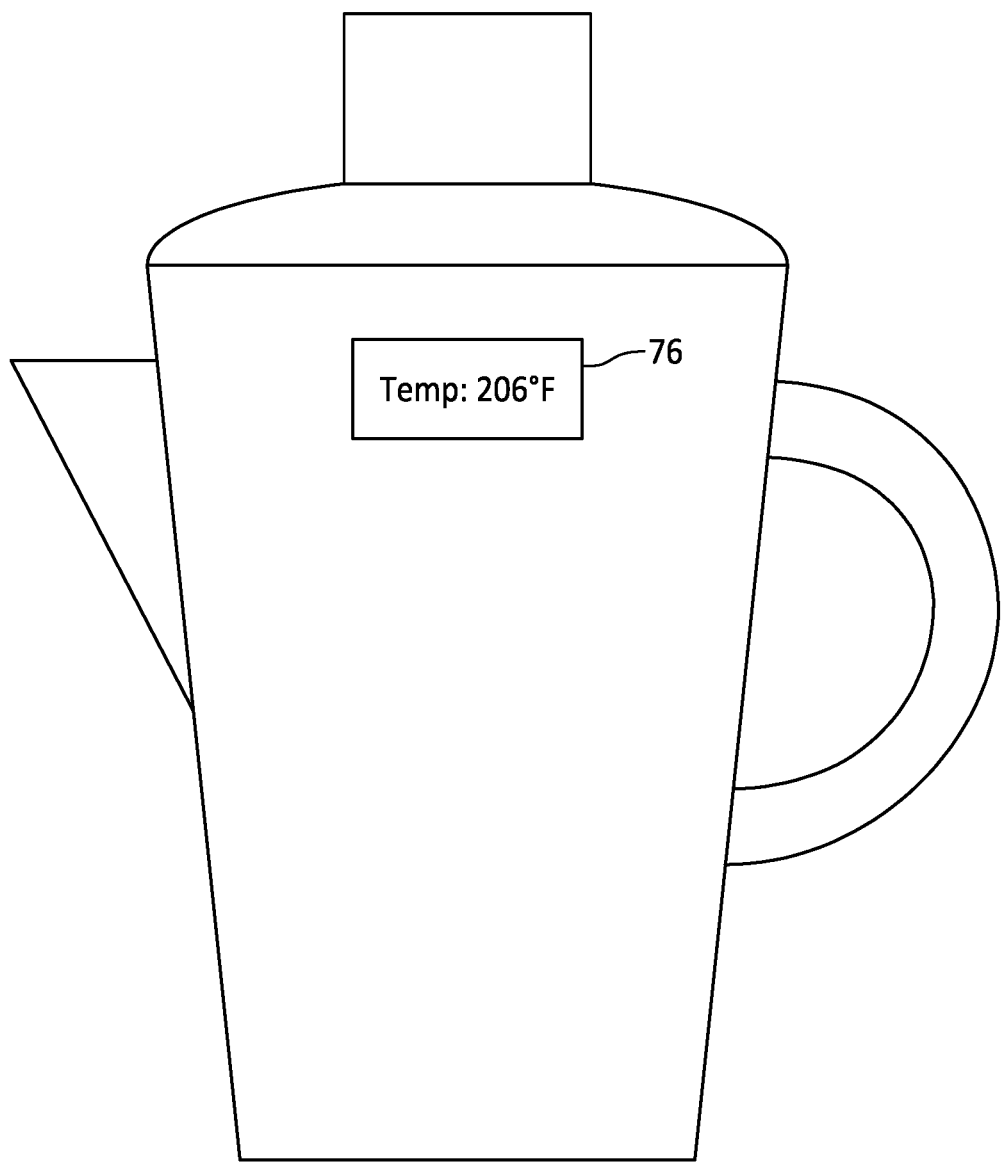
FIG. 14 shows an embodiment of the apparatus that includes a means for displaying the temperature of liquid within the apparatus of the second embodiment of the present invention.
Figure 15:
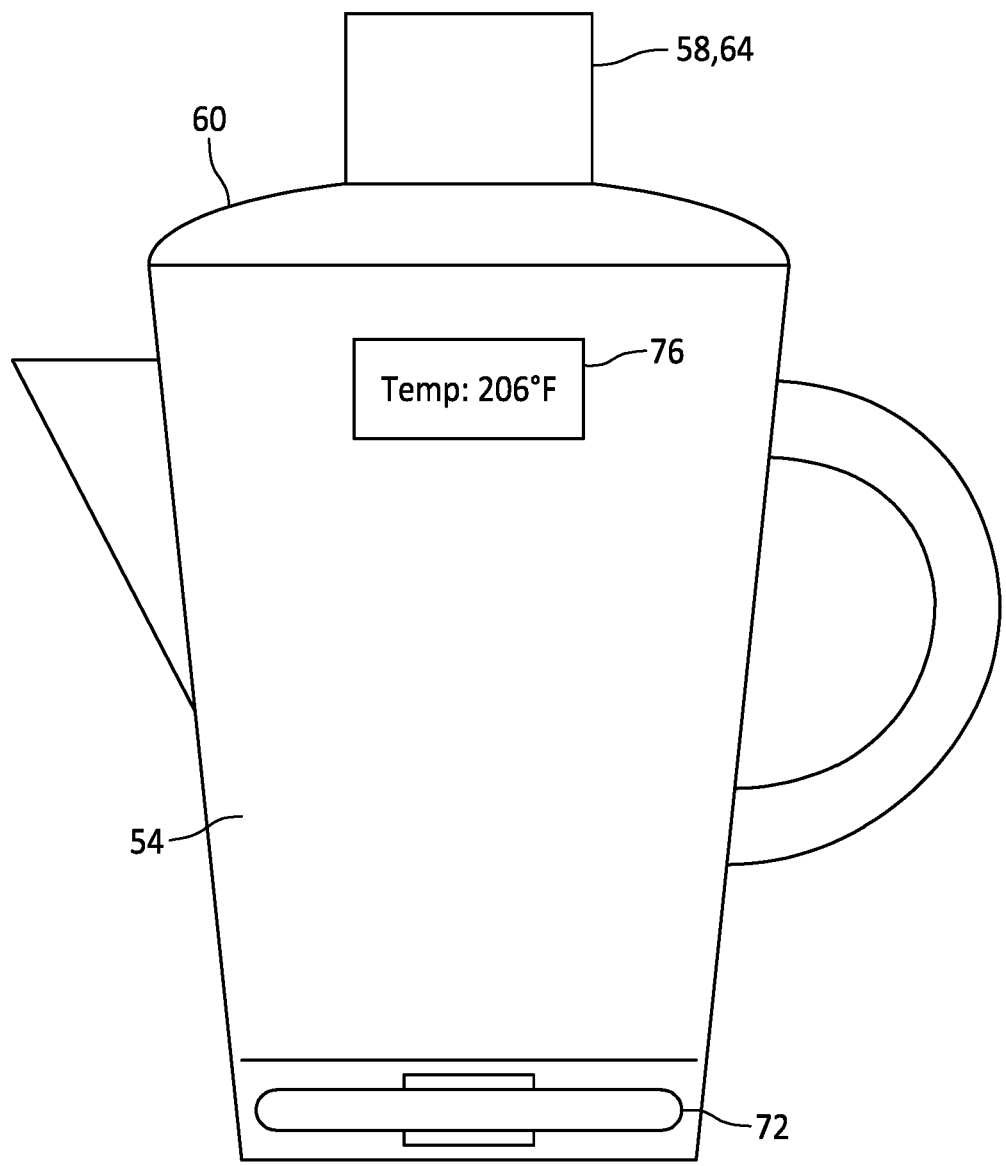
FIG. 15 shows an embodiment of the apparatus that includes a mean for heating liquid within the apparatus of the second embodiment of the present invention.
Figure 16A:
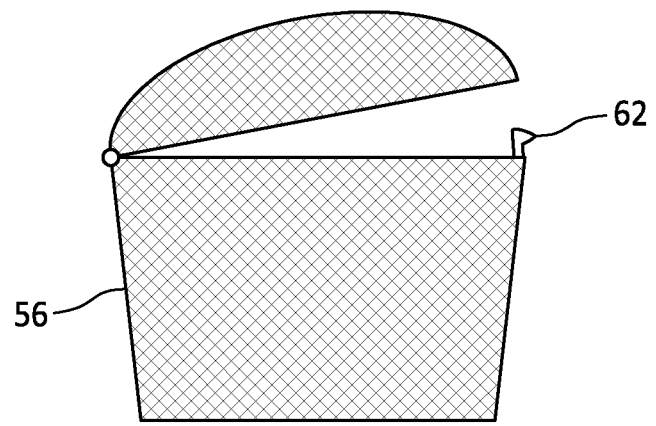
FIGS. 16A and 16B show how the basket may be opened and closed via a latch in the second embodiment of the present invention.
Figure 16B:
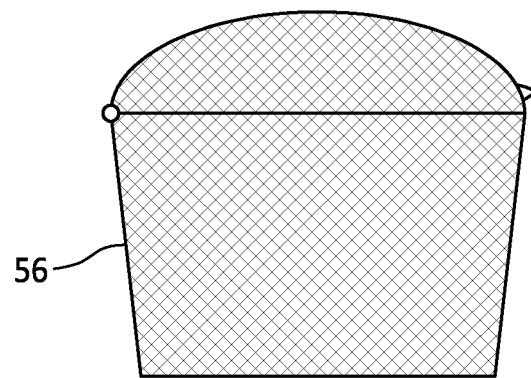
Figure 17A:
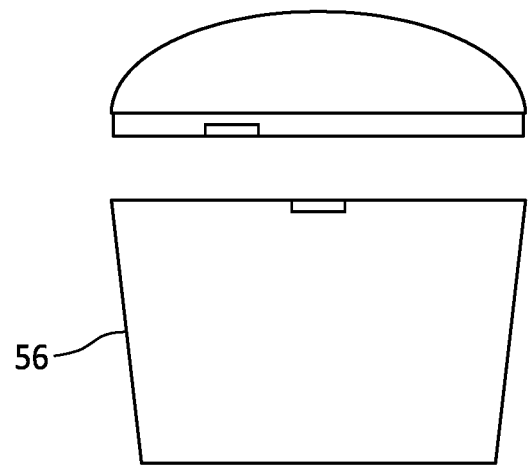
FIGS. 17A and 17B show how the basket may be opened and closed via a "twist-lock" of the second embodiment of the present invention.
Figure 17B:
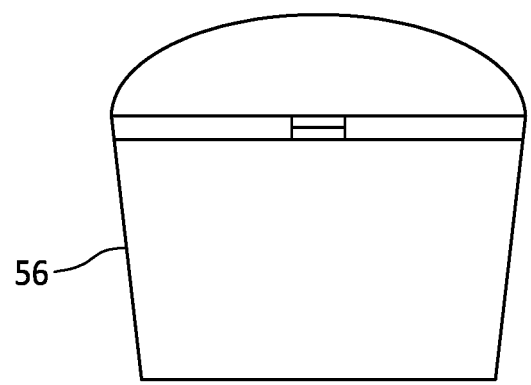

Other embodiments of the present invention may include electronic means for monitoring the temperature of the water and alerting the user when the user should reduce or cease applying heat to the apparatus (for an example, see Reference Number 76 at FIGS. 14 and 15). There are numerous electronic means that may be used to monitor the temperature of the water within the apparatus that are well known in the art, and all such means are included within the scope of the present invention. Two of the many examples of such well known electronic means include: (i) an electronic interface that is able to receive input from the elements of the apparatus and relay to the user via display, audible alerts, etc, that the heat should be reduced or removed; and (ii) a standard circuit board with electrical wiring to the elements of the apparatus, where such wiring is able to receive input such as temperature readings of the water within the carafe and alert the user that heat should be reduced or removed.

As noted above, other embodiments may include a means for heating liquid that may be present within the carafe 54. There are numerous methods by which a person with skill in the art can cause the water within the carafe to heat, and all such methods should be considered within the scope of the present invention. In a preferred embodiment shown in FIG. 15, the present invention includes copper coiling 72 that is in contact with the carafe 54. In FIG. 15, the copper coiling 72 is in contact with the bottom of the carafe 54, but the copper coiling 72 may be in contact with any portion of the carafe 54, so long as the placement of the copper coiling 72 does not interfere with the present system's operation or pose a danger for users (for example, the copper coiling 72 may be placed in contact with the sides of the carafe 54).

The process of using copper coils 72 to conduct heat is well known in the art. In short, electricity passes through the copper coils 72, causing them to heat, and the heat of the copper coils 72 is then transferred to the carafe 54 as a result of the coils contacting the carafe's 54 exterior. Once the carafe 54 itself begins to heat, the heat transfers from carafe 54 to the water stored therein. In a preferred embodiment of the present invention, 1200-1500 watts of electricity should be used to heat the carafe 54, as this amount of energy will gradually heat the water in the carafe 54 from tap temperature to approximately boiling (and preferably to between 190 degrees F. and 210 degrees F.) within the 6-8 minutes time frame in which coffee should be brewed.

In any embodiment of the present invention, the carafe may include material that will prevent a user from touching a portion of the carafe that has become hot once heat is applied. There are numerous methods of prohibiting users from burning themselves by touching hot portions of the carafe and all such means should be included within the scope of the present invention. One such means includes covering portions of the carafe in materials that do not conduct heat (or that conduct heat very poorly). There are numerous polymers that are able to withstand heat but not conduct heat well, and such polymers may be used to cover portions of the carafe to prevent user burns. Another means to prevent user burns includes fabricating the handle of the carafe from material that does not conduct heat.

Activating the Means for Agitation

If the embodiment of the invention that the user is using relies on external heat, then the means for agitating the basket must be activated upon the application of such external heat. For example, with respect to the second embodiment (shown in FIG. 13), the means for agitation 58 may be activated manually, such as by pressing a button or a switch 74. In addition, the means for agitation may be activated by the application of such external heat. Those with skill in the art will recognize that there are numerous means for adapting the means for agitation such that the application of external heat will activate the means for agitating the basket and all such numerous means should be considered within the scope of the present invention for all embodiments. One such means for activating the agitation means upon the application of heat includes electronic means. As described above, the present invention may include an electronic interface that is able to receive input from the elements of the apparatus. Such electronic interface may also be configured to send signals to elements of the apparatus based on the input that it has received from other elements of the apparatus. Thus, the electronic interface may receive input that heat is being applied to the water within the water chamber 4 (first embodiment) or the carafe 54 (second embodiment) and may then send a signal that activates the means for agitating the basket 6, 56.

If the embodiment of the present invention includes means for heating the water within the carafe, such as the copper coiling shown in FIG. 15 of the second embodiment, and described above, then the means for agitating the basket may be activated upon the activation of the apparatus' means for heating the water. Those of skill in the art will recognize how the means for agitating the basket may be adapted to activate upon the activating of the means for heating the water within the carafe or water chamber.

Alternatively, even if the embodiment of the present invention includes a means for heating the water within the carafe, the means for agitating the basket may be activated separately from the means for heating the water. For example, the means for agitating the basket may be activated by a standalone button or switch that must be pressed independently of activating the means for heating the water within the carafe.

Referring now to FIGS. 18-23, a third embodiment of the present invention is shown and described herein. In similar fashion to the first and second embodiments of the present invention, the third embodiment provides an apparatus and method for brewing coffee and other beverages, such as tea, that employs an infusion process and liquid agitation, which extracts enhanced amounts of oil from coffee beans, coffee grounds, filter packs of coffee, tea, and the like to produce a brewed coffee of the highest quality and taste. In addition, the apparatus provides heat to the water before and during the brewing process to ensure proper water temperature for optimal brewing (e.g., between 190 degrees F. and 210 degrees F.). The apparatus includes a vessel that holds liquid, such as but not limited to water. A basket is positioned within the vessel to hold filter packs of coffee, coffee beans, coffee grounds, tea, and the like (hereinafter "coffee" for ease of description) during the brewing process. A shaft extends down through the basket attached on one end to a motorized actuator assembly or a rotating device and the other end to the basket. The basket agitates the liquid while the brewing process occurs.

Once the user adds liquid and places the coffee grounds into the apparatus' basket, the user may use the apparatus to perform the method of brewing coffee disclosed herein, which is an automated process. The process is automated meaning that by starting a brewing cycle, the apparatus will begin agitating the liquid in the vessel and using a heating element to heat the liquid in the vessel from tap temperature to approximately boiling. The heating-agitation process lasts approximately 8 minutes. Once heating-agitation process is complete, the user may then enjoy the brewed coffee. This process takes all of the best elements from Turkish and French Press, and is significantly more efficient in extracting oil from coffee than any known, to the inventor, method or system of brewing coffee that is currently available. As a result of this increased efficiency, less coffee is generally required to brew coffee and users can expect monitorial savings.

Figure 18:
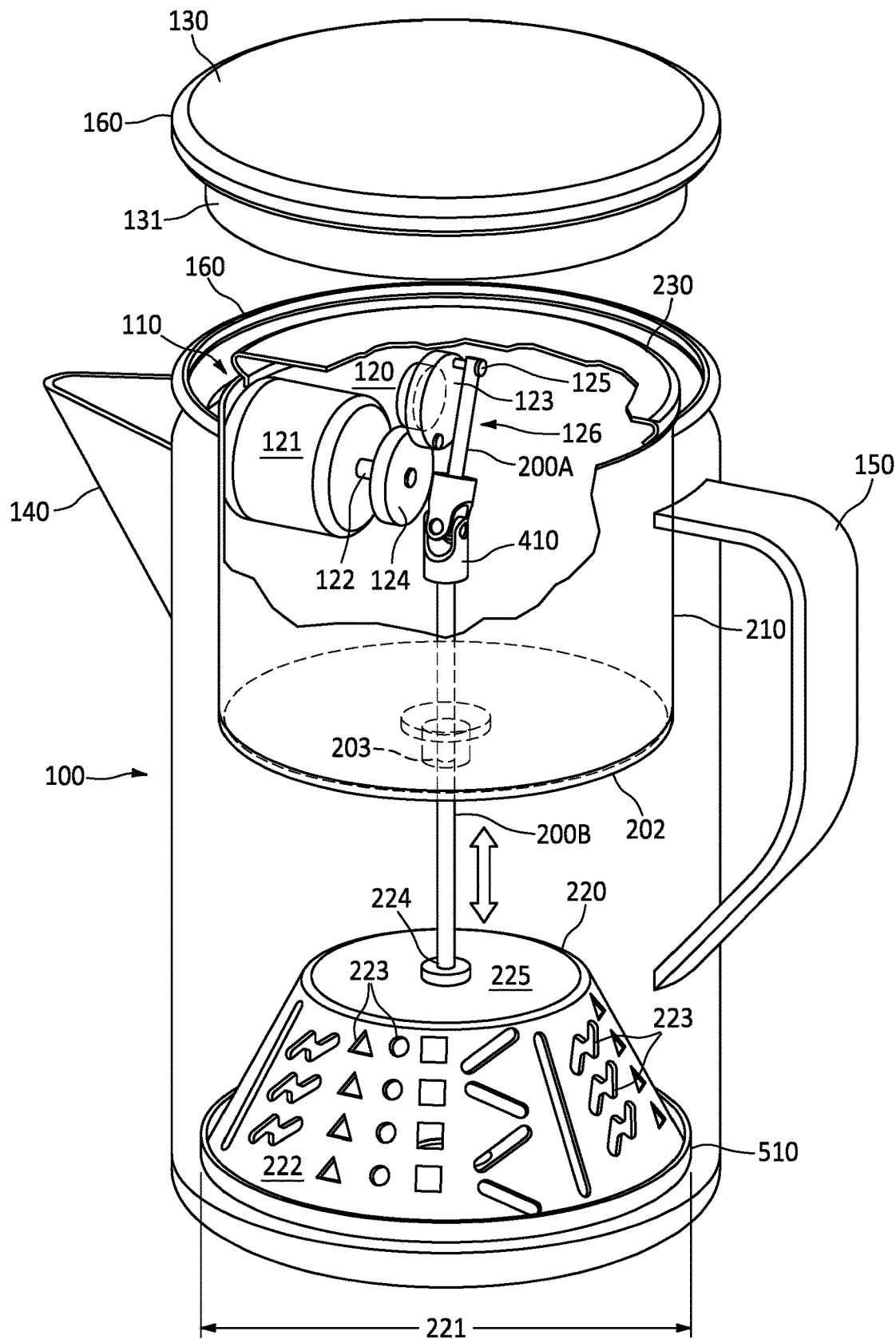
FIG. 18 illustrates a cross sectional perspective view of the apparatus, in accordance with aspects of the disclosure of the third embodiment of the present invention.
Figure 19:
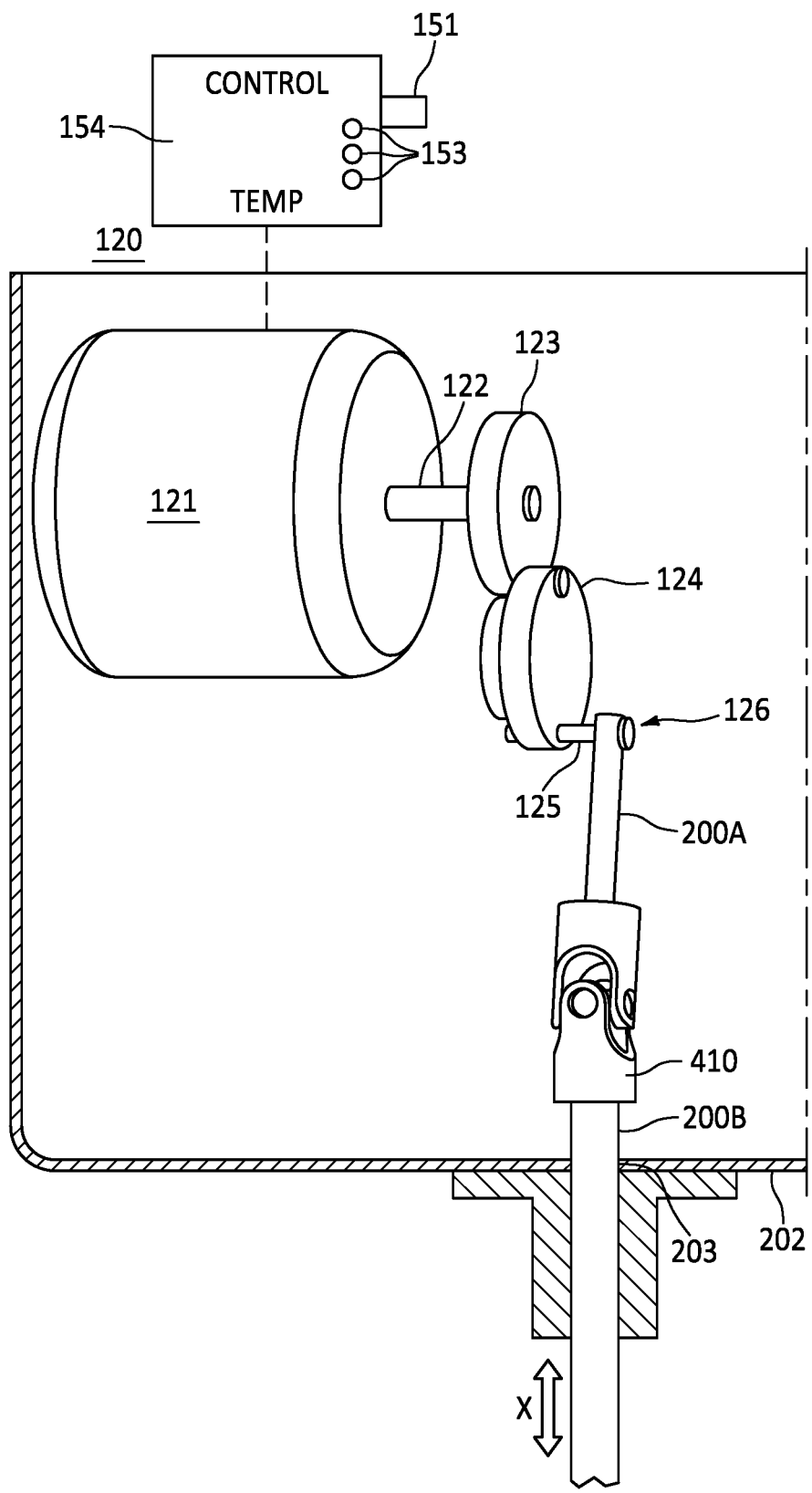
FIG. 19 illustrate an internal view of the chamber and motorized actuator assembly of the apparatus, in accordance with aspects of the disclosure of the third embodiment of the present invention.

With reference to FIGS. 18 and 19, that illustrate a cross sectional overviews of the apparatus. The apparatus includes a vessel 100 that is able to hold a liquid and can withstand heat. For example, and in no way intended to limit the embodiments, vessel 100 can be formed of a metal, such as, but not limited to, stainless steel, however other metals, ceramics, and/or other materials that can withstand being heated are within the scope of the embodiments. The vessel 100 includes a top opening 110. A shaft 200 extends into the vessel 100 through a chamber 210. Chamber 210 houses motorized actuator assembly 120, and motorized actuator assembly 120 is coupled to one end of shaft 200, shaft 200A. A basket 220 is fixedly coupled to the other opposed end of shaft 200, shaft 200B.

Vessel 100 may also include a spout 140 that enables pouring liquid from vessel 100. Spout 140 is fixed near top opening 110. Vessel 100 may be provided with a handle 150, where handle 150 may also be fixed to vessel 100 near top opening 110. Handle 150 is often on an opposite side of vessel 100 approximately 180 degrees rotated from spout 140. Handle 150 may be of any shape permitting vessel 100 to be maneuvered by handle 150 by a user.

Basket 220, as illustrated in FIGS. 18, 20, 22, and 23, has a diameter 221 to fit within vessel 100. Basket 220 also includes a cavity 222 including openings 223. Access to cavity 222 of basket 220 is provided by a cover 510 disposed on a portion of basket 220. In the illustrated embodiments, cover 510 is provided on a bottom portion of basket 220. As discussed herein, cover 510 also includes openings 223 for ingress and egress of liquid from vessel 100 into basket 220. Vessel 100 is able to hold liquids and solid ingredients (as described herein solids or "ingredients") can be disposed in basket 220. Thus, when the apparatus 100 reciprocates basket 220, solid ingredients in cavity 222 can be contacted by liquid as liquid enters and exits basket 220 through openings 223.

Chamber 210 is positioned at top opening 110 when in the vessel 100 and may be made of any temperature resistant material. Chamber 210 includes a bottom rim that frictionally and tightly fits into top opening 110 of vessel 100. Chamber 210 also includes an upper side 160 that closes vessel 100. Chamber 210 may be provided with a similar circumferential perimeter and diameter as vessel 100, with a lower perimeter and diameter 211 less than a diameter of vessel 100, thus chamber 210 may be able to fit within vessel 100. Diameter 211 enables chamber 210 to fit through top opening 110 into vessel 100.

Chamber 210 is liquid tight and is sealed, even though in use chamber 210 stays above liquid in vessel 100. Chamber 210 encloses motorized actuator assembly 120. Motorized actuator assembly 120 is coupled to shaft 200, 200A, as illustrated by FIG. 18 and FIG. 19. Motorized actuator assembly 120 may be any device with a rotating structure for moving shaft 200, as is described herein. Motorized actuator assembly 120 may be coated or covered by a temperature and liquid resistance material. This coating prevents motorized actuator assembly 120 from damage due to increased temperatures or liquid.

Motorized actuator assembly 120 moves and controls shaft 200, 200A. Motorized actuator assembly 120 includes at least one of an alternating-current (AC) electric power supply or a battery drive (in some instances a rechargeable battery drive) or driven motor 121. Battery driven motor 121 in some instances may include a rechargeable battery drive. Battery driven motor 121 includes a rotor 122 that is rotated by battery driven motor 121. A rechargeable battery charge port can be positioned on any side of chamber 210, for example and in no manner intended to limit the instant embodiments, the charge port may be on the side of chamber 210 or on the top of chamber 210. Alternately, and in some embodiments, motorized actuator assembly 120 can be powered by a motor connected to an external power supply. That external power supply can include, but is not limited to, an AC cord, or any other external power supply now known or hereinafter developed.

Rotor 122 is connected to a first cam or gear 123. First cam or gear 123 is connected to an offset cam or gear 124 at connection point 127. Offset cam or gear 124 includes a pin or rod 125 is attached to shaft 200, 200A by a coupling 126. Coupling 126 may include, but is not limited to a slot and pin connection, pins, fixed attachments, screw connections, or any suitable coupling now known or hereinafter developed. In aspects of the embodiments, first cam or gear 123 and offset cam or gear 124 can be formed as one unitary and integral component. In other aspects of the embodiments, first cam or gear 123 and offset cam or gear 124 can be separate but connected elements. As illustrated, first cam or gear 123 and offset cam or gear 124 can be separate but connected by connection point 127.

In aspects of embodiments, motorized actuator assembly 120 moves the coupling coupled to shaft 200, 200A in a generally oscillating vertically linear (arrow X) motion, but the motion may include some non-vertically linear motion by virtue of the connection at coupling 126. The rotation of first cam or gear 123 and offset cam or gear 124 inherently provided vertical motion to shaft 200, 200A, but as understood from standard mechanics, the rotation of first cam or gear 123 and offset cam or gear 124 can impart some non-vertical non-linear motion to shaft 200, 200A.

Motorized actuator assembly 120 is electronically driven by a control 154. Control 154 includes an automatic temperature sensing and control module. Control 154 includes an "on" or "start" switch 151. Once the motorized actuator assembly 120 is started by a user actuating an "on" or "start" switch 151 of control 154, the motorized actuator assembly 120 will operate to transfer rotation of rotor 122 to generally vertical motion but not entirely linear motion to shaft 200, 200A as described herein.

Automatic temperature sensing and control module of control 154 of the motorized actuator assembly 120 will sense the temperature of liquid in vessel 100 until a designated temperature to start and to halt operation and movement of basket 220 (as described here) is reached. Control 154 includes at least one indicator, and the at least one indicator can include at least one temperature indicator that can indicate various temperature levels of liquid in vessel 100. Each at least one indicator 153 may provide a user with an indication that a temperature for starting motorized actuator assembly 120 has been reached. Another indicator of the at least one indicator 153 may provide the user with an indication that a designated "highest" temperature for making coffee for example, a temperature below boiling, for example in a range from 180 degrees F. to 210 degrees F., and more preferably from 190 degrees F. to temperatures below 210 degrees F. has been reached. Further, a single indicator of the at least one indicator 153 may provide all indications by various modes of signals. As embodied by the disclosure, various modes of signals may include but are not limited to flashing, colors, audio signals and/or customized signals as programmed by a user, or any signal type now known or hereinafter developed. Control 154 can be provided with a function that automatically turns off operation of motorized actuator assembly 120, if desired. Alternatively, and in addition, at least one indicator 153 may provide an alert to user to turn off motorized actuator assembly 120 and/or remove vessel 100 from heat.

FIG. 21A and FIG. 21B illustrate universal joint 410 that connects portions 200, 200A and 200, 200B of shaft 200 within chamber 210. Universal joint 410 includes a coupling connector, which connects rigid rods 412. The coupling connector may include a pair of hinges oriented together freely connected by a crossing of rigid rods 412. Shaft 200 includes a first shaft 200, 200A and a second shaft 200, 200B. Universal joint 410 couples first shaft 200, 200A to second shaft 200, 200B via the rigid rods 411, 412 that allows relative movement in two axes. Universal joint 410 allows first shaft 200, 200A and second shaft 200, 200B to move independent of one another. In universal joint 410, a single rotational degree of freedom is constrained (the shaft rotation) as well as all relative translations, giving a universal joint two degrees of freedom.

In the embodiment seen in FIG. 4A, first shaft 200, 200A is smaller in length than second shaft 200, 200B. First shaft 200, 200A is coupled to motorized actuator assembly 120 by pin 125. Shaft 200, 200B extends from universal joint 410 through bottom surface 202 of chamber 210 through an aperture or hole 203 in bottom surface 202. Shaft 200, 200B extends from universal joint 410 through bottom surface 202 of chamber 210 through an aperture or hole 203 and moves in a substantially vertical movement in vessel 100. In terms of this description, the term "substantially vertical movement" means that the movement of shaft 200, 200B from the universal joint 410 is almost all vertical and linear so the basket 220 moves within vessel 100 without contact of sides of vessel 100. Conversely, the term "substantially linear movement" means that movement is almost all linear.

Hole 203 and shaft 200, 200B are close in diameter that an essentially liquid-tight junction is formed by their engagement. If desired, a seal (not illustrated for facilitating understanding) a tight sealed against liquid ingress into chamber 210. This configuration, with or without a seal, permits vertical and essentially linear motion of shaft 200, 200B at hole 203.

Figure 20:
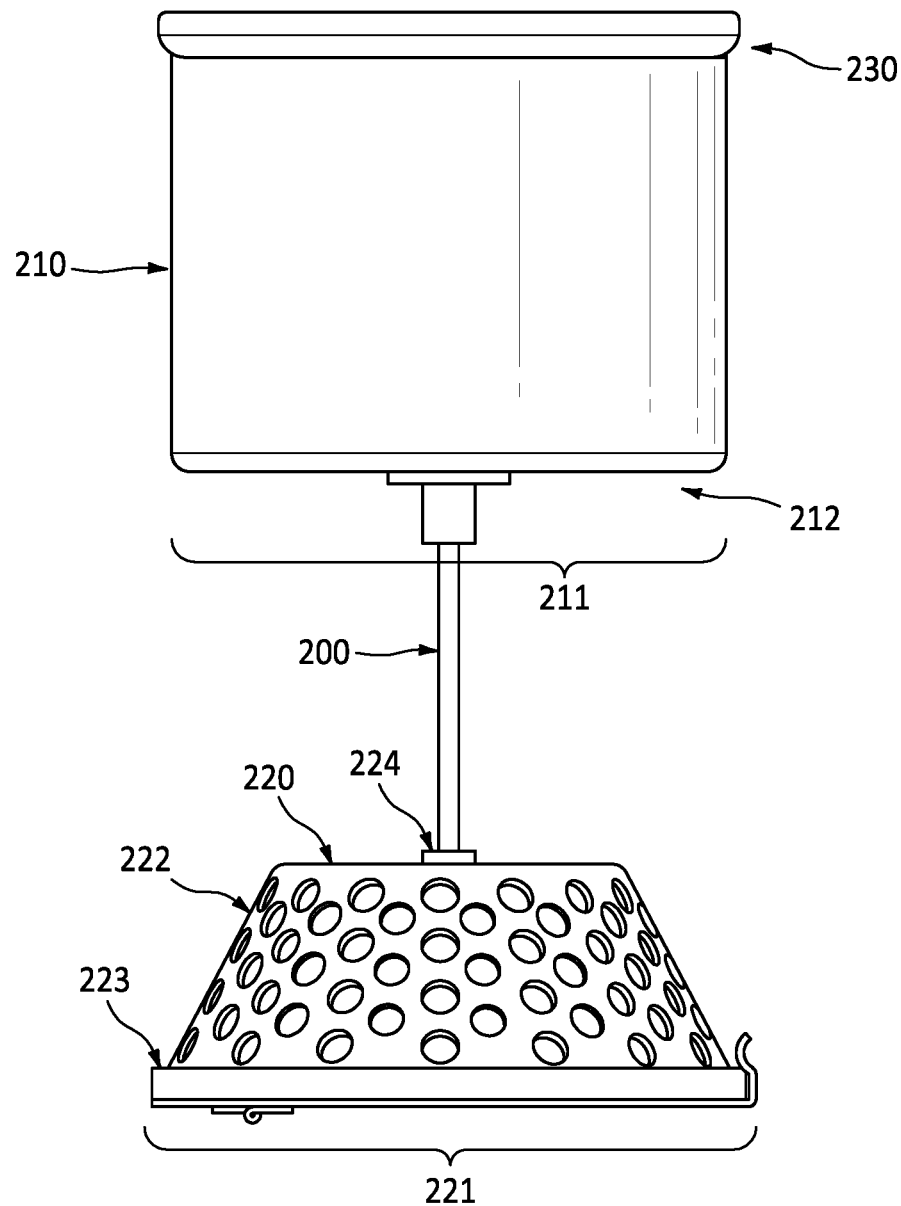
FIG. 20 illustrates a perspective view of the chamber, shaft and basket, in accordance with aspects of the disclosure of the third embodiment of the present invention.

With additional reference to FIGS. 18 and 20, basket 220 is coupled to a lower portion of shaft 200, 200B. Basket 220 may be made of any temperature resistant material. Basket 220 vertically and essentially linearly with shaft 200, 200B, as noted. Shaft 200, 200B is fixed to a top 225 of basket 220 at rigid connection 224. Basket 220 includes cavity 222 that can hold coffee, or another solid ingredient, such as, but not limited to, coffee beans, coffee bags, filter packs of coffee, coffee grounds, tea bags, tea leaves, flavorings, hot cocoa mixes, herbs, chicory, chai, matcha, and anything that can be brewed, now known or hereinafter conceived.

Basket 220 may include a multitude of ports, holes, orifices, or openings, referred to as openings 223. Basket 220 can be vertically and essentially linearly moved in direction (arrow X) by shaft 200, 200B at rigid connection 224. This vertical and essentially linear movement permits agitation of liquid within vessel 100. Movement of basket 220 permits liquid to transgress into and out of basket 220. Interaction of liquid into and out of basket 220 can create a turbulent and agitated flow and movement of liquid. The turbulent and agitated flow and movement of liquid can be within vessel 100 and also can be within basket 220. The turbulent and agitated flow and movement of liquid within basket 220 can permit enhanced liquid contact with solid ingredients within basket 220. The overall contact of liquid and solids/ingredient(s), for example, coffee, with the movement of liquid and solid ingredients, for example coffee, within basket 220 creates an infusion process during brewing where increased amounts of coffee oil is entrained in liquid.

Openings 223 allow liquid to enter and exit while limiting the exit of solid ingredients, if coffee or solids are disposed in basket 220. Openings 223 may be formed in any shapes, pattern, or configurations including round holes, polygonal holes, slots, ellipsoids, and spirals, combinations thereof, or any configuration or pattern now known or hereinafter designed. Moreover, openings 223 can be provided with irregularly shaped perimeters, which can increase turbulation and agitation of liquid, both in vessel 100 and in basket 220.

Basket 220 includes a cover 510 that encloses cavity 222. Cover 510 may be coupled to basket 220 by any coupling structure 520. Coupling structure 520 can include, but is not limited to, screw coupling, friction fit, bayonet coupling, fastening, clipping, snap on or other coupling structure, now known or hereinafter developed. Cover 510 may be perforated in a similar manner as cavity 222. Cover 510 may include at least one opening 223 or a series of openings 223. Cover 510 may be closable to retain ingredients within basket 220.

Figure 22:
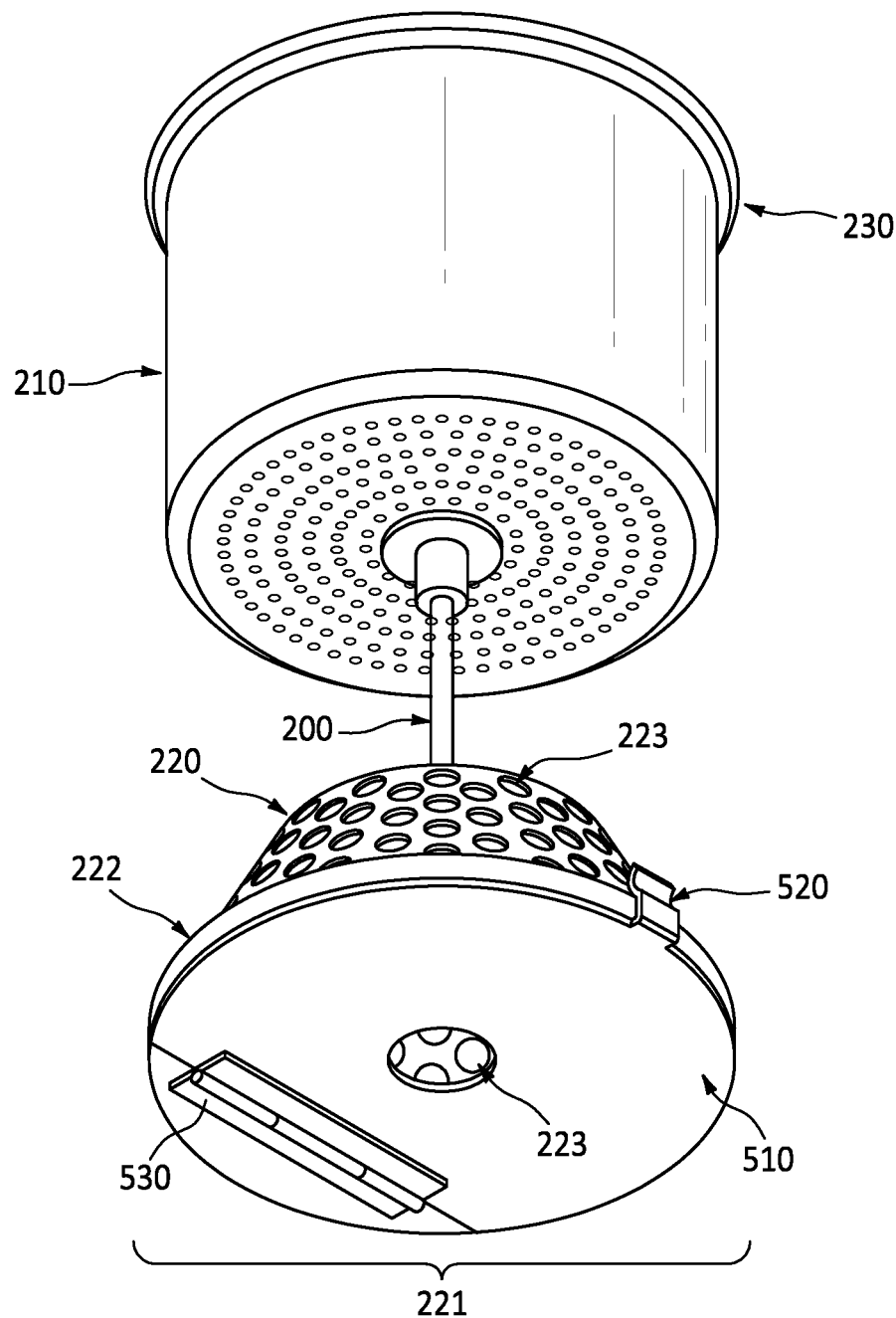
FIG. 22 illustrates a perspective view of the basket, shaft, and chamber, in accordance with aspects of the disclosure of the third embodiment of the present invention.
Figure 23:
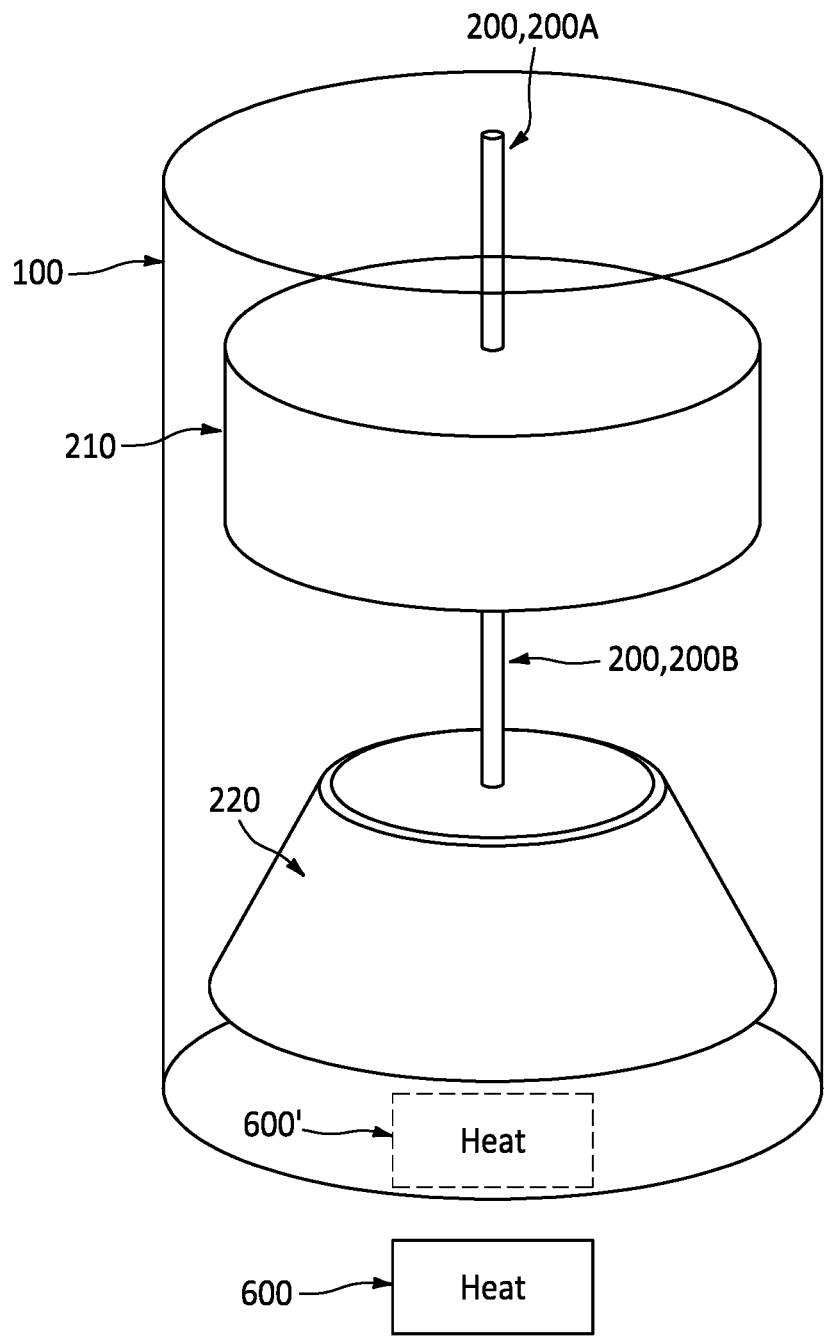
FIG. 23 illustrates a bottom perspective view basket, shaft, and chamber, in accordance with aspects of the disclosure of the third embodiment of the present invention.

FIG. 22 illustrates a bottom perspective view of basket 220 and cover 510. Cover 510 may be coupled to basket 220 via a pivot, joint, axis, hinge, swivel, or other suitable coupling mechanism, hereinafter hinge 530. Cover 510 opens at hinge 530 to permit access to cavity 222. Opening(s) 223 allows for liquid to flow into cavity 222 and contact any solid ingredients therein. Opening(s) 223 can be spaced on cover 510 to promote liquid flow into and out of basket

220. Size changes in opening(s) 223 can alter liquid flow into and out of basket 220 and alter liquid interaction with materials in cavity 222, which can increase turbulation and agitation of liquid, both in vessel 100 and in basket 220.

The Brewing Process

The process for brewing coffee that is implemented using the present invention has already been described in part above with respect to the three embodiments, but for completeness is set forth herein in total for each.

The brewing process for the apparatus of the first embodiment includes the following steps:

1) The user accesses the basket 6 and places a packet 2 of coffee grounds therein. Alternatively, the user may purchase a packet that is pre-loaded with coffee grounds.
2) The user manually adds water to the water chamber 4. This may be done by opening the apparatus to access the water chamber 4, opening the water chamber 4, and pouring water therein (the user could add water to the chamber before placing the packet into the basket; the order of these two steps is within the user's discretion). Ideally, the amount of water added to the carafe should result in the basket being fully submerged (though this amount of water is not strictly required).
3) Once the packet 2 is placed in the basket 6, water is added to the water chamber 3, and the basket 6 and water chamber 4 are "closed", then the user may initiate the brewing cycle.
4) The apparatus includes a button (or equivalent means), which upon being pressed by a user will initiate the brewing process.
5) When the brewing process begins, the heating means 8 will begin to heat the water within the water chamber 4 from tap temperature toward the approximately boiling temperature. Alternatively, the user may elect to "pre-heat" water to any desirable temperature between tap water temperature and near boiling (preferably between 190 degrees F. and 210 degrees F.). In the instance the user adds pre-heated water, the system will either heat the water the remainder of the amount necessary to achieve the desired brewing temperature, or will simply maintain the temperature of the water if the water added is already within the desired range.
6) At or about the time the heating means begins to heat the water, the agitating means begins to agitate the coffee grounds within the gradually heating water.
7) Over the course of 6-8 minutes, the heating means raises the temperature of the water from tap temperature (or another temperature at which water is liquid, but tap temperature is preferred) to approximately boiling and the agitation process occurs throughout the time that the water is heating.
8) Once the heating means has raised the water temperature to approximately boiling (and preferably between 190 degrees F. and 210 degrees F.), the heating stops (as discussed below, the heating of the water may be controlled by electronic means) increasing the temperature of the water and, optionally, is adjusted in order to provide an amount of heat necessary to maintain the temperature of the water during brewing within the desired range. At this point, agitation may optionally continue for an additional 30 seconds to one (1) minute.
9) The brewed coffee that has now been created by the heating of the water and agitation of the packet of coffee grounds is now released from the chamber into a storage receptacle situated below the chamber.
10) The apparatus may include means for keeping warm the brewed coffee in the storage receptacle until a user drinks the coffee.

The brewing process for the apparatus of the second embodiment includes the following steps:

1) The user accesses the basket 56 and places a packet 52 of coffee grounds therein. Alternatively, the user may purchase a packet that is pre-loaded with coffee grounds.
2) The user manually adds water to the carafe 54. Ideally, the amount of water added to the carafe should result in the basket being fully submerged (though this amount of water is not strictly required).
3) If the embodiment of the invention that the user is using relies on external heat, the user then applies such external heat. If the embodiment of the invention that the user is using includes a means for heating the water within the carafe, the user activates the means for heating the water.
4) At or about the time the water begins to heat, the agitating means begins to agitate the coffee grounds within the gradually heating water.
5) Over the course of 6-8 minutes, the heating means raises the temperature of the water from tap temperature (or another temperature at which water is liquid, but tap temperature is preferred) to approximately boiling and the agitation process occurs throughout the time that the water is heating. Alternatively, the user may elect to "pre-heat" water to any desirable temperature between tap water temperature and near boiling (preferably between 190 degrees F. and 210 degrees F.). In the instance the user adds pre-heated water, the system will either heat the water the remainder of the amount necessary to achieve the desired brewing temperature, or will simply maintain the temperature of the water if the water added is already within the desired range.
6) Once the heating means has raised the water temperature to approximately boiling (and preferably between 190 degrees F. and 210 degrees F.), the heating stops (as discussed herein, the heating of the water may be controlled by electronic means or manually) increasing the temperature of the water and, optionally, is adjusted in order to provide an amount of heat necessary to maintain the temperature of the water during brewing within the desired range. At this point, agitation may continue for an additional 30 seconds to one (1) minute.
7) The brewed coffee that has now been created by the heating of the water and agitation of the packet of coffee grounds may now be poured from the carafe and enjoyed by the user.

If the embodiment of the present invention includes a means for heating the water within the carafe, then the means for heating the water may also keep the coffee warm once the brewing process has completed.

In addition, in embodiments of the invention that include a means for heating the water within the carafe, both the apparatus and the method may be controlled by automated, electronic means. The electronic control means enables a user to vary the settings of the apparatus and how it employs the method in order to brew coffee to suit the user's preference. For example, a user could use the electronic control means to program the apparatus to agitate the grounds for less time during the brewing cycle, resulting in a less robust coffee. Electronic control means allows the entire brewing cycle to run from start to finish without additional action by the user once the user has added coffee and water to the system and has used the electronic control means to configure the brew cycle to suit the user's preference and then has pressed the start button (or similar means for initiating the brewing cycle). There are numerous electronic control means that may be used to control the apparatus and method that are well known in the art, and all such means are included within the scope of the present invention. As noted above, two of the many examples of such well known electronic control means include: (i) an electronic interface that is able to send instructions to and receive input from the elements of the apparatus, thereby enabling the interface to control each element; and (ii) a standard circuit board with electrical wiring to the elements of the apparatus, where such wiring is able to send instructions to and receive input from each element.

The brewing process for the apparatus of the third embodiment includes the following steps:

1) A liquid is added to vessel 100. A first solid ingredient (i.e., coffee) is added to cavity 222 within basket 220. Basket 220 is then positioned within vessel 100, with shaft 200, 200B being disposed within vessel 100. Chamber 210 flows thereafter and is positioned at top opening 110 of vessel 100.

2) A user engages "on" or "start" switch 151 and electronics of control 154 are activated. An indicator light of the at least one indicator 53 will exhibit a first color that designates initiation of operations.

3) Heat is applied to vessel 100, either from a heat supply 600, such as vessel 100 on a stove or vessel will contain an integral heating source. Control 154, which includes indicator lights 53, such as indicator lights for temperature, operational status, and the like. Control 154 also can automatically start motorized actuator assembly 120 when the predetermined temperature of liquid in vessel 100 is reached.

4) When a temperature of the liquid in vessel 100 is about 165 degrees F., indicator lights 53 change to alert the user that the liquid is reaching a temperature for optimum brewing. Further, when the sensed temperature reaches a temperature from about 180 degree F. to about 200 degrees F. indicator lights 53 change once again to indicate to the user to reduce heat/temperature to vessel 100.

4) When the brewing of the beverage is complete, control 154 ceases operation of motorized actuator assembly 120. Thus, movement of basket 220 ceases and the brewed beverage is ready.

In certain aspects of the embodiments, control 154 can reduce heat or automatically turn heat supply 600 off. Moreover, aspects of the embodiments include audible signals in addition to temperature indicators 53 to provide the user with information on the overall process operational progression.

Application to Other Brewed Beverages

The present invention's primary goal is to provide an apparatus and method to enable consumers to more efficiently and economically brew higher quality coffee than can be brewed using the coffee making systems that are currently available. As such, much discussion of the present invention is framed in terms of brewing coffee. But it should be understood that the present invention may be used to brew other beverages in addition to coffee. For example, as many of the same principles that apply to brewing coffee also apply to brewing tea, a user may utilize the apparatus and method disclosed herein to make tea.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus for brewing coffee, the apparatus comprising:
   a vessel capable of receiving and storing a volume of water, the vessel including an opening;
   a container for holding an amount of coffee grounds that is positionable within the vessel;
   a lid that is connected to the vessel by a hinge and is movable between at least a first position and a second position, the lid at least partially covering the opening when in the first position and the lid is spaced away from the opening when in the second position;
   a motor connected to the lid such that the motor is generally above the volume of water at times the lid is in the first position and the motor is spaced from the vessel when the lid is in the second position;
   wherein the motor is connected to the container via at least one shaft, the shaft having a first end and a second end;
   wherein the first end of the shaft is positioned closer to the motor than the second end and is positioned generally above the volume of water;
   wherein the container is in a brewing position and at least partially submerged in the volume of water at times the lid is in the first position during brewing;
   wherein the container and the amount of coffee grounds held therein are agitated in the volume of water at times the motor is actuated;
   wherein the second end of the shaft is positioned in the volume of water during the actuation of the motor;
   wherein the container is in a non-brewing position and at least partially removed from the vessel at times the lid is in the second position; and
   wherein the container is rotated in an arc about the hinge at times the container is moved from the brewing position to the non-brewing position.

2. The apparatus of claim 1 wherein the container is completely submerged in the volume of water at times the motor is actuated.

3. The apparatus of claim 1 further includes a heat source, the heat source operable to heat the volume of water.

4. The apparatus of claim 3 wherein the heat source is operable to increase a temperature of the volume of water to a temperature between 190 degrees F. and 210 degrees F.

5. The apparatus of claim 3 wherein the heat source is operable to maintain a temperature of the volume of water between 190 degrees F. and 210 degrees F. at times the motor is actuated.

6. The apparatus of claim 1 wherein the container is at least partially removable from a second end of the shaft.

7. The apparatus of claim 1 wherein the container is completely removable from the second end of the shaft.

8. The apparatus of claim 1 wherein the motor rotates the container in the amount of water when actuated.

9. The apparatus of claim 1 wherein the motor moves the container generally up and down in the amount of water when actuated.

* * * * *